(12) United States Patent
Wang et al.

(10) Patent No.: US 11,971,951 B2
(45) Date of Patent: Apr. 30, 2024

(54) SYSTEMS AND METHODS USING A WEARABLE SENSOR FOR SPORTS ACTION RECOGNITION AND ASSESSMENT

(71) Applicant: City University of Hong Kong, Kowloon (HK)

(72) Inventors: Yufan Wang, Hong Kong (HK); Wen Jung Li, Hong Kong (HK); Ho Man Chan, Hong Kong (HK); Guanglie Zhang, Shenzhen (CN)

(73) Assignee: City University of Hong Kong, Kowloon (HK)

( * ) Notice: Subject to any disclaimer, the term of this patent is extended or adjusted under 35 U.S.C. 154(b) by 498 days.

(21) Appl. No.: 16/014,584

(22) Filed: Jun. 21, 2018

(65) Prior Publication Data
US 2019/0388728 A1    Dec. 26, 2019

(51) Int. Cl.
*G06F 18/10*    (2023.01)
*A63B 24/00*    (2006.01)
(Continued)

(52) U.S. Cl.
CPC .......... *G06F 18/10* (2023.01); *A63B 24/0006* (2013.01); *G06F 18/2113* (2023.01);
(Continued)

(58) Field of Classification Search
None
See application file for complete search history.

(56) References Cited

U.S. PATENT DOCUMENTS 5,715,280 A * 2/1998 Sandberg ............ H04L 27/2647
                                              375/261
6,266,623 B1 * 7/2001 Vock ...................... A63C 11/00
                                              702/56
(Continued)

OTHER PUBLICATIONS

Support Vector Machines Using GMM Supervectors for Speaker Verification (W.M. Campbell, Member IEEE, D. E. Sturirn, Member IEEE, and D. A. Reynolds, Senior Member; IEEE May 2006) (Year: 2006).*
(Continued)

*Primary Examiner* — Shelby A Turner
*Assistant Examiner* — Brandon J Becker
(74) *Attorney, Agent, or Firm* — Norton Rose Fulbright US LLP

(57) ABSTRACT

Systems and methods which provide a motion sensor data-driven framework for sports action recognition and/or assessment using a wearable sensor are described. A motion sensor data-driven system may provide real-time kinematical analysis to athletes engaged in active competition or training sessions under typical competition or training conditions. Analysis of motion sensor data provided according to embodiments may operate to recognize instances of one or more particular sports actions performed by an athlete and/or assess the skill of the athlete from analysis of one or more sports actions. A motion sensor data processing platform of embodiments of a motion sensor data-driven system may comprise a processor-based system configured to receive and analyze data regarding the movement of an athlete's limb reported by a wearable sensor device comprising a micro inertial measurement unit configuration for capturing and reporting data regarding the movement of an athlete's limb.

9 Claims, 13 Drawing Sheets

(51) Int. Cl.
G06F 18/20 (2023.01)
G06F 18/21 (2023.01)
G06F 18/2113 (2023.01)
G06V 40/20 (2022.01)

(52) U.S. Cl.
CPC .......... *G06F 18/2193* (2023.01); *G06F 18/29* (2023.01); *G06V 40/23* (2022.01); *A63B 2220/803* (2013.01); *A63B 2220/836* (2013.01); *G06F 2218/04* (2023.01)

(56) References Cited

U.S. PATENT DOCUMENTS

| | | | |
|---|---|---|---|
| 7,101,287 B1 | 9/2006 | Wagner | |
| 7,602,301 B1* | 10/2009 | Stirling | A63B 69/3667 340/573.1 |
| 7,749,110 B2 | 7/2010 | Bozof | |
| 9,710,612 B2 | 7/2017 | Sampathkumaran | |
| 2005/0018891 A1* | 1/2005 | Barfuss | A61B 34/20 382/131 |
| 2008/0300914 A1* | 12/2008 | Karkanias | A63B 71/0622 705/2 |
| 2009/0029754 A1* | 1/2009 | Slocum | A63B 71/0622 463/5 |
| 2010/0094590 A1* | 4/2010 | Ozonat | G06F 11/3409 702/179 |
| 2012/0088544 A1* | 4/2012 | Bentley | A63F 13/332 455/556.1 |
| 2014/0220527 A1* | 8/2014 | Li | G09B 19/003 434/262 |
| 2015/0141175 A1 | 5/2015 | Pisupati et al. | |
| 2016/0030804 A1* | 2/2016 | Mizuochi | A61B 5/11 482/8 |
| 2016/0210838 A1* | 7/2016 | Yan | G08B 25/001 |
| 2017/0061817 A1* | 3/2017 | Mettler May | G09B 19/003 |
| 2017/0086519 A1 | 3/2017 | Vigano' et al. | |
| 2017/0220854 A1* | 8/2017 | Yang | G06K 9/6267 |
| 2017/0266501 A1* | 9/2017 | Sanders | G06N 3/08 |
| 2017/0296106 A1* | 10/2017 | Naidu | A61B 5/6807 |
| 2018/0021653 A1* | 1/2018 | Thornbrue | G06Q 10/0639 473/453 |
| 2018/0197078 A1* | 7/2018 | Khan | G06Q 10/0639 |

OTHER PUBLICATIONS

"This Was How Volleyball was Introduced—Facts and Information About the Game," Website, 2015. [Online]. Available: http://www.athleticscholarships.net/history-of-volleyball.htm.
Palao, J. M. et al. "Validity of the Standing Spike Test as a Monitoring Protocol for Female Volleyball Players," Biology of Sport, vol. 29, No. 4, pp. 281-284, 2012, 4 pages.
Arvind, D. K. et al. "The Speckled Golfer," Proceedings of the 3rd International ICST Conference on Body Area Networks, (2008), 7 pages.
Chen, M. et al. "Body Area Networks: A Survey," Mob. Networks Appl., vol. 16, No. 2, pp. 171-193, 2011, 23 pages.
Ahmadi, A. et al. "Towards a Wearable Device for Skill Assessment and Skill Acquisition of a Tennis Player During the First Serve," Sports Technology, vol. 2, No. 3-4, pp. 129-136, 2009, 8 pages.
Shan, C. Z. et al. "Investigation of Upper Limb Movement During Badminton Smash," 10th Asian Control Conference (ASCC), pp. 1-6, 2015, 6 pages.
Hong, Y.-J. et al. "Activity Recognition Using Wearable Sensors for Elder Care," 2008 Second International Conference on Future Generation Communication and Networking, pp. 302-305, 2008, 4 pages.
Chang, H.-C. et al. "A Wearable Inertial Measurement System With Complementary Filter for Gait Analysis of Patients With Stroke or Parkinson's Disease," IEEE Access, vol. 4, pp. 8442-8453, 2016, 11 pages.

Zheng Y.-L. et al. "Unobtrusive Sensing and Wearable Devices for Health Informatics," IEEE Transactions on Biomedical Engineering, vol. 61, No. 5, pp. 1538-1554, May 2014, 17 pages.
Wang W.-F. et al. (2016) Analysis of Movement Effectiveness in Badminton Strokes with Accelerometers. In: Genetic and Evolutionary Computing: Advances in Intelligent Systems and Computing, vol. 387. Springer, Cham, 10 pages.
Lee, J.-N. et al. "A Three-Dimensional Motion Anlaysis of Horse Rider in Wireless Sensor Network Environments," Int. J. Adv. Comp. Sci. Appl., vol. 5, No. 11, pp. 50-55, 2014, 6 pages.
Ermes, M. et al. "Detection of Daily Activities and Sports With Wearable Sensors in Controlled and Uncontrolled Conditions," IEEE Transactions on Information Technology in Biomedicine, vol. 12, No. 1, pp. 20-26, Jan. 2008, 7 pages.
Jarning, J. M. et al. "Application of a Tri-axial Accelerometer to Estimate Jump Frequency in Volleyball," Sports Biomechanics, vol. 14:1, pp. 95-105, 2015, 11 pages.
Ghasemzadeh, H. et al. "Wearable Coach for Sport Training: A Quantitative Model to Evaluate Wrist-rotation in Golf," JAISE 1, pp. 173-184, 2009, 13 pages.
Jelfs, B. et al. "Recruitment of Small Synergistic Movement Makes a Good Pianist," 2015 37th Annual International Conference of the IEEE Engineering in Medicine and Biology Society (EMBC), 2015, pp. 242-245, 4 pages.
Cherkassky, V. et al. "Practical Selection of SVM Parameters and Noise Estimation for SVM Regression," Neural Networks vol. 17, No. 1, 2004, 22 pages.
Lees, A. "Science and The Major Racket Sports: A Review," Journal of Sports Sciences, vol. 21, No. 9, 707-732, 2003, 26 pages.
Wang, J. et al. "Teaching Badminton Based on Student Skill Levels," Strategies, vol. 22, No. 6, pp. 14-18, 2009, 5 pages.
Kwan, M. et al. "Investigation of High-speed Badminton Racket Kinematics by Motion Capture," Sports Eng. vol. 13, No. 2, pp. 57-63, 2011, 7 pages.
Zhu, G. et al. "Human Behavior Analysis for Highlight Ranking in Broadcast Racket Sports Video," IEEE Transactions on Multimedia, vol. 9, No. 6, pp. 1167-1182, 2007, 16 pages.
Nagasawa, M. et al. "Smash Motion Analysis for Badminton from Image," Proceedings of the IIEEJ Image Electronics and Visual Computing Workshop, pp. 1-8, 2012, 8 pages.
Chen, Z. et al. "3D Vision Based Fast Badminton Localization with Prediction and Error Elimination for Badminton Robot," 2016 12th World Congress on Intelligent Control and Automation (WCICA). 2016, pp. 3050-3055, 6 pages.
Bisio, I. et al. "Enabling IoT for In-Home Rehabilitation: Accelerometer Signals Classification Methods for Activity and Movement Recognition," IEEE Internet of Things Journal, vol. 4, No. 1, pp. 135-146, 2017, 11 pages.
Mitsui, T. et al. "Support System for Improving Golf Swing by Using Wearable Sensors," 2015 Eighth International Conference on Mobile Computing and Ubiquitous Networking (ICMU), pp. 100-101, 2015, 2 pages.
Akpinar, S. et al. "Coincidence-anticipation Timing Requirements are Different in Racket Sports," Perceptual and Motor Skills vol. 115, No. 2, pp. 581-593. 2012, 13 pages.
Ghasemzadeh, H. et al. "Body Sensor Networks for Baseball Swing Training: Coordination Analysis of Human Movements Using Motion Transcripts," 2010 8th IEEE International Conference on Pervasive Computing and Communications Workshops, pp. 792-795, 2010, 4 pages.
Wang, Y. et al. "Volleyball Skill Assessment Using a Single Wearable Micro Inertial Measurement Unit at Wrist," IEEE Access, vol. 6, pp. 13758-13765, Jan. 2018, 8 pages.
Dialog Semiconductor, "Bluetooth Low Energy 4.2 SoC with Flash Memory," DA14583 Datasheet, Nov. 2016, 150 pages.
Wang, Z. et al. "Badminton Stroke Recognition Based on Body Sensor Networks," IEEE Transactions on Human-Machine Systems, vol. 46, No. 5, pp. 769-775, 2016. 7 pages.
Bosch Sensortec, "BMI160 Datasheet," Prod. Specif., pp. 1-19, 2015.
InvenSense, "MPU9250 Datasheet," Prod. Specif., pp. 1-42, 2016.
St-Microelectronics, "LSM9DS1 Datasheet," pp. 1-72, 2015.

(56) References Cited

OTHER PUBLICATIONS

Okeyo, G. et al. "Dynamic Sensor Data Segmentation for Real-time Knowledge-driven Activity Recognition," Pervasive and Mobile Computing, vol. 10, pp. 155-172, 2014, 18 pages.
Bengio, Y. et al. "Out-of-Sample Extensions for LLE, Isomap, MDS, Eigenmaps, and Spectral Clustering," Proceedings of the 16th International Conference on Neural Information Processing Systems, pp. 177-184, 2003, 8 pages.
Campbell, W. M. et al. "Support Vector Machines Using GMM Supervectors for Speaker Verification," IEEE Signal Processing Letters, vol. 13, No. 5, pp. 308-311, 2006, 4 pages.
Rocha, A. et al. "Multiclass From Binary: Expanding One-Versus-All, One-Versus-One and ECOC-Based Approaches," IEEE Transactions on Neural Networks and Learning Systems, vol. 25, No. 2, pp. 289-302, 2014, 14 pages.
Keerthi, S. S. et al. "SMO Algorithm for Least-squares SVM Formulations," Neural Computation, vol. 15, No. 2, pp. 487-507, 2003, 21 pages.
Wang, Y. et al. "IoT for Next-Generation Racket Sports Training." IEEE Internet of Things Journal, May 2018, 10 pages.
Roque, E. (2001). Volleyball Coaching Manual. Los Angeles, California: LA84 Foundation.
Kenny, B. & Gregory, C. (2006). Volleyball: Steps to Success. Champaign, Illinois: Human Kinetics.
McGown, C. (1994) Science of Coaching Volleyball, Champaign, Illinois: Human Kinetics.

\* cited by examiner

1100

1: for all $i,j$ such that $1 < i < I, 1 < j < J$ do
2. Load the raw data signal $\check{S}(t)_{ij}$ and implement the 3-point moving average filter to obtain $S(t)_{ij}$.
3. Extract the features of the $i$th volleyball spiker, $f_1 ... f_m$, from the raw data signal $S|(t)_{ij}$ into a new matrix $\check{X}_j$.
4. end for
5: Merge the matrices $\check{x}_1, ... \check{x}_n$ into one matrix, $\check{X}$.
6: for all $i$ such that $1 < i < I$, do
7: Using PCA to process each $\check{X}_j$ to obtain the new features $c_1,...c_p$ from the old features $f_1,...f_m$ and compile a new data set $X_j$.
8: Merge the matrices $x_1, ...x_n$ into one matrix $X$.
9: end for

1: for all $i,k$ such that $1 < i < I, 1 < k < P$, do
2. $C_{ik} \leftarrow (C_{ik}\text{-min}(C_j)) / (\text{max}(C_j)\text{-min}(C_j))$.
3. end for
4. Merge the updated matrices $x_1...x_n$ into one matrix $X$.
5: Calculate the skill assessment model by inputting the training data $X$.
5: while $i < I$, do
6: $d(X^T) = \Sigma_{j=1}^{1} y_j\alpha_j X_j X^T + b0$
7. end while

FIG. 12

SYSTEMS AND METHODS USING A WEARABLE SENSOR FOR SPORTS ACTION RECOGNITION AND ASSESSMENT

TECHNICAL FIELD

The present invention relates generally to sports action assessment and, more particularly, to motion sensor data-driven systems using a wearable sensor for sports action recognition and/or assessment, such as may be used for sports training.

BACKGROUND OF THE INVENTION

Sports activities are widely popular throughout the world for casual enthusiasts through elite or professional players. For example, athletes at various levels (e.g., amateur, sub-elite, elite, etc.) commonly participate in racket sports (e.g., badminton, tennis, racket ball, table tennis, paddleball, squash, etc.) or other sports (e.g., volleyball, tetherball, etc.) in which a limb of the player is swung for performing a number of sports actions (e.g., lob, volley, drop, spike, smash, serve, clear, return, etc.). The athletes may seek to improve their performance with respect to a chosen sport through analysis of their performance of one or more sports actions (e.g., key, fundamental, and/or often repeated sports actions) employed in the sport.

The traditional method for athletes to keep track of their actions as well as their performance, such as for calculating personal statistics, is using high-speed optometric systems. However, this traditional method has technical shortcomings, such as environment constraints, computational load, and costly equipment. For example, with respect to environmental constraints, the videography of the traditional high-speed optometric method usually needs to be performed in a lab setting (e.g., for lighting and athlete image isolation needs, to accommodate placing physical markers on the athlete, to eliminate blind spots, etc.), which does not comply well with live competition or real-time training conditions, see e.g., Z. Chen, et al., "3D Vision Based Fast Badminton Localization with Prediction and Error Elimination for Badminton Robot," and C. Z. Shan, et al., "Investigation of Upper Limb Movement during Badminton Smash," the disclosures of which are incorporated herein by reference. With respect to computational load, the image processing required (e.g., for isolating the athlete, identifying movement associated with an action, resolving marker crossover phenomenon, etc.) and the video data size demands require substantial computing resources, which is generally incompatible with presenting results in real-time and typically requires costly computing equipment, see e.g., D. K. Arvind, et al., "The Speckled Golfer," the disclosure of which is incorporated herein by reference. In addition to the aforementioned costly computing equipment, the high-speed optometric systems are typically quite costly, and require high-speed equipment to operate, and thus the traditional method can be both costly to implement and use. Accordingly, it can be appreciated from the foregoing that the traditional high-speed optometric method is costly and is unable to provide kinematical analysis to athletes in real-time.

More recently, researchers have shifted their efforts to capture and analyze sports activities to consider the use of inertial sensors worn on the body to capture the motion outside the lab, see e.g., T. Mitsui, et al., "Support System for Improving Golf Swing by Using Wearable Sensors," J. Lee, "A Three-Dimensional Motion Anlaysis of Horse Rider in Wireless Sensor Network Environments," J. M. Jarning, et al., "Application of a Tri-Axial Accelerometer to Estimate Jump Frequency in Volleyball," S. Akpinar, et al., "Coincidence-Anticipation Timing Requirements are Different in Racket Sports," H. Ghasemzadeh, et al., "Body Sensor Networks for Baseball Swing Training: Coordination Analysis of Human Movements Using Motion Transcripts," A. Ahmadi, et al., "Towards a Wearable Device for Skill Assessment and Skill Acquisition of a Tennis Player During the First Serve," Y. Wang, et al., "Volleyball Skill Assessment Using a Single Wearable Micro Inertial Measurement Unit," M. Ermes, et al., "Detection of Daily Activities and Sports with Wearable Sensors in Controlled and Uncontrolled Conditions," and H. Ghasemzadeh, et al., "Wearable Coach for Sport Training: A quantitative Model to Evaluate Wrist-Rotation in Golf," the disclosures of which are incorporated herein by reference. The use of such inertial sensors has been directed to collection of motion data by using two-axis gyroscopes with relatively limited analyses being conducted with respect to how to utilize these data for training, see e.g., T. T. Zin, et al., "Genetic and Evolutionary Computing: Proceedings of the Ninth International Conference on Genetic and Evolutionary Computing," the disclosure of which is incorporated herein by reference. Moreover, there has been a lack of investigation on reducing the number of sensors required for wearable applications to realize the same functionalities.

BRIEF SUMMARY OF THE INVENTION

The present invention is directed to systems and methods which provide a motion sensor data-driven framework for sports action recognition and/or assessment using a wearable sensor. Systems and methods of a motion sensor data-driven framework according to embodiments herein may be implemented for providing sports action recognition and/or assessment, such as may be used for sports training, with respect to various sports (e.g., racket sports, such as badminton, tennis, racket ball, table tennis, paddleball, squash, etc., and non-racket sports, such as volleyball, tetherball, American handball, etc., collectively referred to herein as limb stroke sports) in which a limb of the player is swung for performing sports actions (e.g., lob, volley, drop, spike, smash, serve, clear, return, etc.). A motion sensor data-driven system may, for example, provide real-time kinematical analysis to athletes engaged in active competition or training sessions under typical competition or training conditions. Analysis of motion sensor data provided according to embodiments may operate to recognize instances of one or more particular sports actions performed by an athlete and/or assess the skill of the athlete (e.g., to categorize the athlete, such as amateur, sub-elite, elite, etc.) from analysis of one or more sports actions. Such quantifying of sports actions may, for example, be of great interest in facilitating assessment of and providing training guidance to athletes by trainers, coaches, etc.

A motion sensor data-driven system of embodiments of the invention includes a wearable sensor device (WSD) for data collection and a motion sensor data processing platform operable cooperatively to provide sports action recognition and/or assessment. Embodiments of a motion sensor data-driven system may, for example, comprise an Internet-of-Things (IoT) framework that may be readily extended to analyze the sports actions and skill levels of athletes in various limb stroke sports.

A WSD of embodiments of a motion sensor data-driven system may comprise a microelectromechanical system (MEMS) based inertial sensor in a micro inertial measurement unit (μIMU) configuration for capturing and reporting data regarding the movement of an athlete's limb. A WSD utilized according to embodiments of the invention includes a single motion sensor, such as the aforementioned MEMS inertial sensor, disposed in a small package to facilitate wearability near a distal end (e.g., wrist or ankle) of an athlete's limb that is swung for performing sports actions. The WSD is preferably provided in a wireless configuration (e.g., using Bluetooth low energy (BLE) technology, wireless local area network (WLAN), 5G IoT machine to machine type communications (MMTC), etc.) to facilitate real-time delivery of data to a motion sensor data processing platform of embodiments of a motion sensor data-driven system.

A motion sensor data processing platform of embodiments of a motion sensor data-driven system may comprise a processor-based system configured to receive and analyze data regarding the movement of an athlete's limb reported by a WSD. A motion sensor data processing platform according to embodiments of the invention may comprise a distributed system (e.g., a mobile app and a cloud-based data process unit) or other configuration (e.g., local computing device). Irrespective of the particular configuration of a motion sensor data processing platform, the motion sensor data processing platform of embodiments of a motion sensor data-driven system comprise logic (e.g., comprising artificial intelligence implementing machine learning, data mining algorithms, etc.) configured to analyze data provided by a WSD for recognizing particular sports actions and/or providing statistics and assessments of an athlete's actions and performance during a game or training session.

Embodiments of a motion sensor data-driven system may, for example, provide a limb stroke sports action recognition and/or skill assessment platform using a single sensor unit and computing resources disposed in the cloud. In operation, motion data collected by an μIMU of a WSD may be sent a local mobile device (e.g., smartphone, personal digital assistant (PDA), etc.) executing an application (e.g., mobile APP) of embodiments of a motion sensor data processing platform, such as through BLE. Once the mobile device receives the motion data, the mobile device may send the motion data to a remote (e.g., cloud-based) server for processing and return of sports action assessment information, such as in real-time or near real-time. Athletes may thus access the sports action assessment information, such as using the aforementioned application executed by the local mobile device and/or another user client, in real-time, near real-time, and/or thereafter.

Motion analysis is an important factor in building self-awareness of athletes in playing sports. Motion sensor data-driven systems of embodiments providing wearable sensing devices to automatically recognize different actions and provide statistics during matches enable athletes and/or their coaches to assess their performance in ways that have heretofore not been possible or not widely available. Accordingly, using a MEMS sensor to capture motion data can help limb stroke sports athletes improve their skills, and thus motion sensor data-driven systems of embodiments herein offering the advantage of dynamic monitoring of one or more athletes in any environment may play a significant role for next-generation limb stroke sports training.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. For example, it will be apparent to one having ordinary skill in the art from the following description when considered in connection with the accompanying sports figures that embodiments of the invention changes training from experience-driven to data-driven.

BRIEF DESCRIPTION OF THE DRAWING

For a more complete understanding of the present invention, reference is now made to the following descriptions taken in conjunction with the accompanying drawing, in which:

FIG. 11 shows a skill assessment preparation algorithm as may be implemented by a motion sensor data-driven system of embodiments of the present invention;

FIG. 12 shows a skill assessment model training algorithm as may be implemented by a motion sensor data-driven system of embodiments of the present invention.

DETAILED DESCRIPTION OF THE INVENTION

A motion sensor data-driven framework is provided for sports action recognition and/or assessment using a wearable sensor according to embodiments of the present invention. For example, a motion sensor data-driven system of embodiments provides a low-cost smart sports action recognition system configured for use with respect to one or more limb stroke sports (e.g., racket sports, such as badminton, tennis, racket ball, table tennis, paddleball, squash, etc., non-racket sports that utilize a bat, club, or other equipment, such as baseball, golf, etc., and non-racket sports, such as volleyball, tetherball, American handball, etc. that utilize an athlete's appendage without a racket, bat, club, or other such equipment) for providing kinematical analysis to athletes engaged in active competition or training sessions under typical conditions (i.e., in competition or training venue environments which are not specifically configured to facilitate in the collection of sports activity data). Using motion sensor data-driven systems in accordance with concepts of the present invention, a data-based report may be provided to athletes themselves, their coaches and trainers, as well as physiotherapist, which can enable all of the foregoing to observe the specific changes during a training or competition. Accordingly, in operation according to motion sensor data-driven systems of embodiments, athletes can be notified if they made some mistakes with respect to various sports actions they perform while still engaged in a training session or competition, and this can improve their training efficiency and decrease the injury rate. This can largely improve the training and therapeutic efficiency. Moreover, motion sensor data-driven systems of embodiments of the invention are capable of ranking the level of athletes, which can allow athletes to find the same level partners to maximize the joy and safety of playing sports.

Figure 1A:
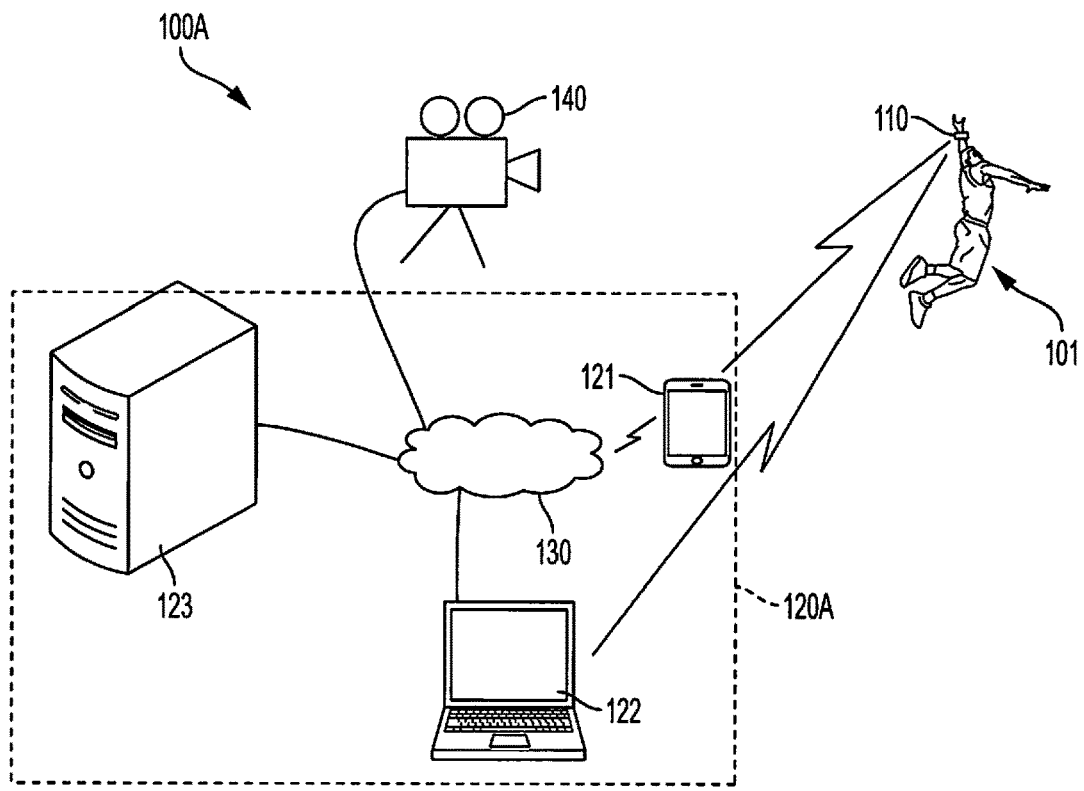
FIGS. 1A and 1B show motion sensor data-driven systems of embodiments of the present invention.
Figure 1B:
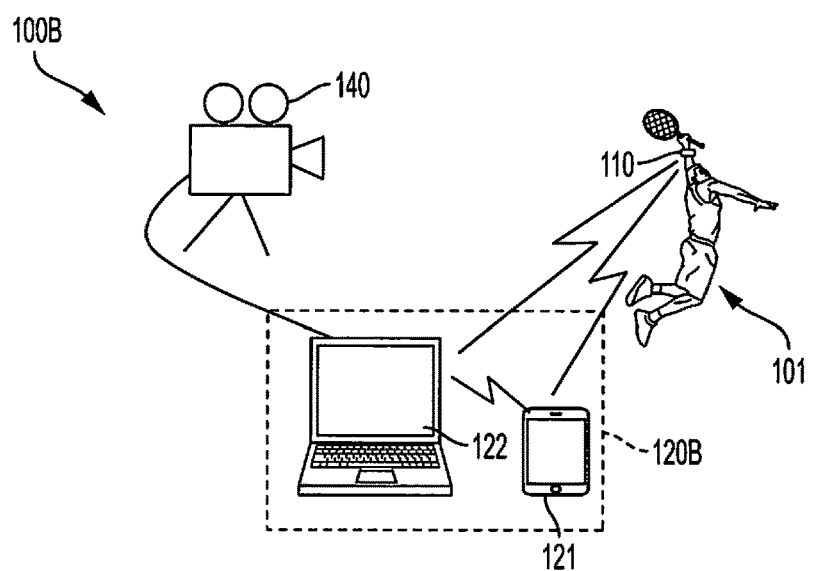

FIGS. 1A and 1B show exemplary embodiments of motion sensor data-driven systems 100 in accordance with concepts of the present invention. Embodiments of motion sensor data-driven systems 100 may, for example, comprise an Internet-of-Things (IoT) framework configured to analyze the sports actions and skill levels of athletes in various limb stroke sports. In the embodiments illustrated in FIGS. 1A and 1B, motion sensor data-driven systems 100 comprise wearable sensor device (WSD) 110 for data collection and motion sensor data processing platform 120 operable cooperatively with WSD 110 to provide sports action recognition and/or assessment, such as may be used for sports training with respect to various limb stroke sports. In operation according to embodiments, analysis of motion sensor data by motion sensor data-driven systems 100 provide recognition of instances of one or more particular sports actions (e.g., lob, volley, drop, spike, smash, serve, clear, return, etc.) performed by an athlete (e.g., athlete under observation 101) and/or assess the skill of the athlete (e.g., to categorize the athlete, such as amateur, sub-elite, elite, etc.) from analysis of one or more of the recognized sports actions.

Figure 2A:
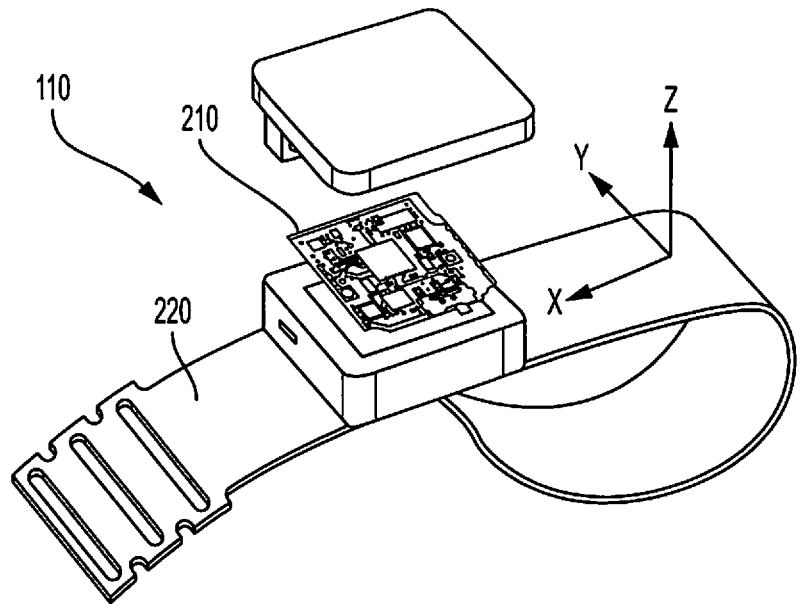
FIGS. 2A and 2B show details of embodiments of a wearable sensor device of the motion sensor data-driven systems of FIGS. 1A and 1B.
Figure 2B:
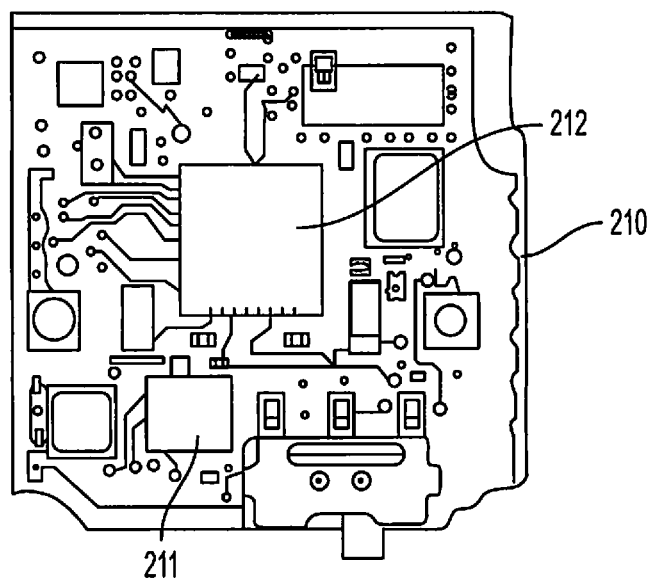

WSD 110 of the embodiments of motion sensor data-driven systems 100 illustrated in FIGS. 1A and 1B may comprise a processor-based device having a micro inertial measurement unit (µIMU), comprising a microelectromechanical system (MEMS) based inertial sensor, configured for capturing and reporting data regarding the movement of an athlete's limb. For example, as shown in FIGS. 2A and 2B, WSD 110 of embodiments of the invention may comprise µIMU 210 having a single MEMS system (shown as inertial sensor 211) providing the motion sensor unit of WSD 110. Inertial sensor 211 may comprise a highly integrated, low power inertial sensor that provides orientation and acceleration readings in x-y-z dimensions (e.g., an inertial measurement unit having sensor system with 3 axes of acceleration and 3 axes of angular rate). Inertial sensor 211 of embodiments may, for example, comprise a commercially available sensor such as a sensor from the MTiO series available from Xsens North America, Inc., the wireless accelerometer available from Noraxon, the BMI 160 sensor available from BOSCH, the Shammer3 available from Shammer Sensing, the Opal sensors available from ADM Wearable Technologies, or the MPU-9250 available from TDK InvenSense. It should be appreciated, however, that although the aforementioned sensors may provide sensing capabilities useful according to embodiments of the present invention, not all are well suited for use in WSD 110 of embodiments herein. For example, the Shimmer3 and Opal sensor products are provided in a form factor that is so large as to be undesirable for use in many implementations of a unobtrusive, wearable sensor device (e.g., a wrist worn sensor utilized during competitive play). As a further example, the MTiO and Noraxon sensor products provide sensor ranges that are insufficient to accommodate measurement of some limb stroke sports actions.

Embodiments of inertial sensor 211 comprise an inertial sensor having a sensor range sufficient for data collection facilitating recognition and/or analysis of particular sports actions associated with one or more limb stroke sports for which motion sensor data-driven system 100 is to be utilized with respect to. For example, as will be better understood from the example implementations that follow, inertial sensor 211 of embodiments is configured to provide at least a 16 g sensor range so as to accommodate sports actions associated with various racket and non-racket sports. Moreover, inertial sensor 211 of embodiments is sufficiently small to accommodate a configuration of µIMU 210 that is small enough to facilitate wearability of WSD 110 near a distal end (e.g., wrist or ankle) of a limb of athlete under observation 101 that is swung for performing sports actions. For example, µIMU 210 of embodiments is provided in a circuit board configuration small enough (e.g., measuring approximately 17 mm×18 mm or 16 mm×18 mm) for disposing in a housing of wristband 220 (e.g., comprising molded silicon or rubber) shown in FIG. 2A. The aforementioned BMI 160 sensor, in addition to providing a 16 g sensor range, is highly integrated so as to be provided in a 2.5 mm×3.0 mm×0.83 mm package size weighing only 2.2 g, facilitating a small implementation of µIMU 210 and correspondingly a wearable configuration of WSD 110 of embodiments of the invention. Similarly, the aforementioned MPU-9250 sensor, in addition to providing a 16 g sensor range, is highly integrated so as to be provided in a 3 mm×3 mm×1 mm package size, facilitating a small implementation of µIMU 210 and correspondingly a wearable configuration of WSD 110 of embodiments of the invention.

Motion sensor data-driven system 100 of embodiments is configured for wireless communication between WSD 110 and motion sensor data processing platform 120 thereof to facilitate sports actions data collection with respect to athlete under observation 101 in typical active competition and/or training session environments. Accordingly, WSD 110 of the embodiments illustrated in FIGS. 1A and 1B is provided in a wireless configuration operable to provide real-time delivery of data to corresponding instance of motion sensor data processing platform 120 of motion sensor data-driven system 100. µIMU 210 of embodiments of the invention may, for example, be configured to support wireless communication using Bluetooth low energy (BLE) technology, wireless local area network (WLAN), 5G IoT machine to machine type communications (MMTC), etc. For example, as shown in FIGS. 2A and 2B, WSD 110 of embodiments of the invention may comprise µIMU 210 having a processor-based transceiver apparatus (shown as processor/transceiver 212), such as may comprise a highly integrated, low power radio transceiver and baseband processor operable to obtain data regarding the movement of an athlete's limb from inertial sensor 211 and transmit the data to a corresponding instance of motion sensor data processing platform 120. Processor/transceiver 212 of embodiments may, for example, comprise a commercially available integrated transceiver package such as the DA14583 product available from Dialog Semiconductor, the nRF51822 product available from Nordic Semiconductor, the CC2640 product available from Texas Instruments, or the CSR1010 product available from Qualcomm. Processor/transceiver 212 of embodiments is configured to provide low power communication with one or more devices of motion sensor data processing platform 120, such as using the aforementioned DA14583 product implementing BLE protocols. Moreover, processor/transceiver 212 of embodiments is sufficiently small to accommodate a configuration of µIMU 210 that is small enough to facilitate the aforementioned wearability of WSD 110. The aforementioned DA14583 product, in addition to providing low power wireless communication, is highly integrated so as to be provided in a 5 mm×5 mm package size, facilitating a small implementation of µIMU 210 and correspondingly a wearable configuration of WSD 110 of embodiments of the invention.

Where wireless communication of motion data from WSD 110 to one or more processor-based system of motion sensor data processing platform 120 is not desired (e.g., non-real-time sports action recognition and/or assessment is to be performed), embodiments of processor/transceiver 212 may provide a processor without integrated transceiver capabilities. For example, an embodiment of motion sensor data-driven system 100 may utilize a microcontroller unit (MCU), such as the ATmega328 available from Microchip, without wireless transceiver capabilities operable to obtain motion sensor data from inertial sensor 211 and store the data (possibly providing processing or pre-processing of the data) for transmission of the data to a corresponding instance of motion sensor data processing platform 120. In such an embodiment, a wireline interface (e.g., micro universal serial bus (USB) connector), a removable computer readable memory (e.g., micro secure digital (SD) card), etc. may be utilized to transfer motion data from WSD 110 to one or more processor-based systems (e.g., computer 122) of motion sensor data processing platform 120. Of course, embodiments of the invention may utilize a MCU without wireless transceiver capabilities paired with a separate transceiver package (e.g., the RN4020 module available from Microchip) for providing low power communication with one or more devices of motion sensor data processing platform 120.

It should be appreciated that, although processor/transceiver 212 has been discussed above with reference to communications with motion sensor data processing platform 120 to provide data regarding the movement of athlete under observation 101, processor/transceiver 212 of embodiments may receive data from one or more devices, such as motion sensor data processing platform 120. For example, a processor of processor/transceiver 212 may operate under control of logic (e.g., one or more instruction sets) controlling operation of WSD 110, wherein processor/transceiver 212 may receive data from motion sensor data processing platform 120 to initiate data collection and reporting, to configure or reconfigure one or more operational aspects of WSD 110, to provide or update instructions executed by the processor, etc.

Motion sensor data processing platforms 120 of motion sensor data-driven systems 100 illustrated in FIGS. 1A and 1B comprise one or more processor-based systems configured to receive and analyze data regarding the movement of an athlete's limb reported by a corresponding instance of WSD 110. For example, motion sensor data processing platforms 120 may comprise processor-based systems, such as a smartphone (e.g., smartphone 121), personal digital assistant (PDA) (not shown), personal computer (e.g., computer 122), server system (e.g., server 123), etc., operable to communicate with WSD 110 as described herein. As described above, the communication of motion sensor data by WSD 110 may be wireless, and thus one or more processor-based systems of motion sensor data processing platforms 120 may be configured to support wireless communication such as using BLE technology, WLAN, 5G IoT MMTC, etc.

A processor-based system of motion sensor data processing platform 120 of embodiments comprises logic (e.g., one or more instruction sets) configured to analyze data provided by WSD 110 for recognizing particular sports actions and providing statistics and assessments of an athlete's actions and performance during a game or training session. For example, logic of motion sensor data processing platform 120 may comprise artificial intelligence implementing machine learning and data mining algorithms configured to provide sports action recognition and/or assessment of the sports actions. In operation of such logic of embodiments of motion sensor data processing platform 120, the system may learn from historical data from real limb stroke sports athletes, and then build a model to recognize different sports actions and the levels from different limb stroke sports athletes in real time. Data processing logic implemented by one or more processors of motion sensor data processing platform 110 may use Discrete Wavelet Transform (DWT) and 3-point filter moving average to filter out sensor noise with respect to the motion sensor data provided by WSD 110. As will be better understood from the example implementations that follow, time domain, frequency domain, and/or morphology features may be extracted by logic implemented by one or more processors of motion sensor data processing platform 110 to assist the classification process and make the results more precise. To realize real-time analysis, window-based algorithms may be implemented by one or more processors of motion sensor data processing platform 110 to automatically segment the different sports actions from continuous data, and thus solve the traditional offline problem. Logic implemented by one or more processors of motion sensor data processing platform 110 for sports action recognition and classification may utilize classification methods such as Support Vector Machine (SVM), k-Nearest Neighbor (k-NN), Naïve Bayes, Neural Network (NN), and/or Decision Tree.

It can be appreciated from the exemplary embodiments illustrated in FIGS. 1A and 1B that motion sensor data processing platform 120 of embodiments of the invention may comprise various configurations. For example, a motion sensor data processing platform of embodiments of the invention may be provided in a distributed system configuration or a local computing device configuration.

Motion sensor data processing platform 100A shown in FIG. 1A provides a distributed system configuration comprising a plurality of processor based systems operable in cooperation to provide analysis of data provided by WSD 110 for recognizing particular sports actions and providing statistics and assessments of actions and performance of athlete under observation 101 during a game or training session. In the distributed system configuration of motion sensor data processing platform 100A, smartphone 121 and/or computer 122 may be operable under control of an instruction set (e.g., a mobile app, client application, etc.) for obtaining motion sensor data from WSD 110. For example, smartphone 121 may be carried on the person of athlete 101 or smartphone 121 or computer 122 may be disposed within communication range of WSD 110 for conducting wireless communications and obtaining motion sensor data from WSD 110 in real-time. Smartphone 121 and/or computer 122 of the distributed system configuration of motion sensor data processing platform 100A may operate to provide (e.g., via network 130, such as may comprise a local area network (LAN), wide area network (WAN), WLAN, cellular network, the Internet, the public switched telephone network (PSTN), etc.) the motion sensor data, and/or data derived therefrom, to server 123 (e.g., a cloud-based server) for processing as described herein. Processing of the data by server 123 may provide sports action recognition and statistics and assessments of the actions and performance of athlete under observation 101 and provide the results to one or more of smartphone 121 and computer 122 for use in providing training guidance to athlete under observation 101, such as by trainers, coaches, etc. Server 123 of embodiments provides cloud-based resources capable of computing and providing the aforementioned results in real-time or near real-time such that athlete under observation 101 and/or trainers, coaches, etc. thereof may access the sports action assessment information, such as using one or more of smartphone 121 and computer 122, in real-time, near real-time, and/or thereafter.

Motion sensor data processing platform 100B shown in FIG. 1B provides a local computing device configuration comprising one or more processor based systems disposed local to WSD 110 and operable to provide analysis of data provided by WSD 110 for recognizing particular sports actions and providing statistics and assessments of actions and performance of athlete under observation 101 during a game or training session. In the local computing device configuration of motion sensor data processing platform 100B, smartphone 121 and/or computer 122 may be operable under control of an instruction set (e.g., a mobile app, client application, etc.) for obtaining motion sensor data from WSD 110. For example, smartphone 121 may be carried on the person of athlete 101 or smartphone 121 or computer 122 may be disposed within communication range of WSD 110 for conducting wireless communications and obtaining motion sensor data from WSD 110 in real-time. Smartphone 121 and/or computer 122 of the distributed system configuration of motion sensor data processing platform 100B are further operable to provide processing of the motion sensor data as described herein. Processing of the data by smartphone 121 and/or computer 122 may provide sports action recognition and statistics and assessments of the actions and performance of athlete under observation 101 and provide the results, possibly to the other one of smartphone 121 and computer 122, for use in providing training guidance to athlete under observation 101, such as by trainers, coaches, etc. Although smartphone 121 and/or computer 122 of embodiments provides local resources capable of computing and providing the aforementioned results, the computing resources may not be as extensive as those available from some forms of computing platforms (e.g., cloud-based server systems), and thus may not be fully capable of providing complete results in real-time. Nevertheless, embodiments of such processor-based systems of motion sensor data processing platform 100B implementing logic and techniques as described herein, as will be better understood from the example implementations that follow, are capable of providing sports action recognition and statistics and assessments of the actions and performance of athlete under observation 101 and providing the results more quickly than operation of traditional high-speed optometric methods.

It should be appreciated from the foregoing that, although motion sensor data-driven systems 100 of the exemplary embodiments illustrated in FIGS. 1A and 1B include image capture device 140 (e.g., a high-speed camera, such as the BASLER acA2000-165 um camera, capable of freezing fast moving objects in an indoor sports center environment as well as providing high definition images), a motion sensor data-driven framework implemented according to concepts herein provides operation very different from that of traditional high-speed optometric methods. Rather than providing the primary motion data capturing device, image capture device 140 of embodiments may be utilized in learning from real limb stroke sports athletes and building models to recognize different sports actions and the levels from different limb stroke sports athletes. For example, image capture device 140 may provide validation for the inertial information received from the sensor system of WSD 110, and for auto-segmentation in the data processing. In an implementation according to concepts of the present invention, image capture device 140 may be used to record an entire experiment process with athletes performing various actions for use in labeling the classification types and analyzing the inertial information received from WSDs to validate the new motion sensor data-driven framework. Once validation of motion sensor information and/or building of appropriate models has been completed, image capture device 140 may be omitted from motion sensor data-driven systems 100 of embodiments of the invention. Accordingly, the computational load required by traditional high-speed optometric methods for the image processing (e.g., for isolating the athlete, identifying movement associated with an action, resolving marker crossover phenomenon, etc.) and the video data size demands of traditional high-speed optometric methods are avoided in operation of a motion sensor data-driven system of embodiments of the present invention. Accordingly, motion sensor data-driven systems implemented using a WSD and motion sensor data processing platform 120 of embodiments herein provides a low-cost, easy-to-use and computational efficient system for analyzing sports actions of one or more limb stroke sports.

Having described motion sensor data-driven systems of embodiments of the invention above, an exemplary implementation of such a motion sensor data-driven system configured for use with respect to a racket sport (e.g., badminton) is described below to aid in understanding the concepts of the present invention. The motion sensor data-driven system of this exemplary implementation provides a smart racket-based sports action recognition and/or skill assessment system using a low-power inertial measurement unit with BLE and cloud technology, demonstrating possibilities in using an IoT framework for sports training. The exemplary motion sensor data-driven system is capable of classifying different actions and differentiating skill levels between professional athletes and amateurs. Moreover, it provides feedback for the quality of various ones of an athlete's sports actions (e.g., smashes and clears).

The motion sensor data-driven system of the exemplary racket sport implementation adopts a distributed system configuration, as shown by FIG. 1A. In particular, the motion sensor data-driven system of the exemplary racket sport implementation comprises a sensor node (e.g., WSD 110), a high-speed camera (e.g., image capture device 140), a mobile device (e.g., smartphone 121), a cloud server (e.g., server 123) and a laptop (e.g., computer 122). It should be appreciated that, although the exemplary motion sensor data-driven system is shown in a distributed system configuration, embodiments of a racket sport implementation of a motion sensor data-driven system may be provided in a local computing device configuration, such as that of FIG. 1B.

The racket sport implementation of the exemplary implementation of the motion sensor data-driven system utilizes a wireless WSD with an overall size of 18 mm×17 mm×2 mm, consistent with configurations shown in FIGS. 2A and 2B, to collect inertial data. In operation, the exemplary racket sport motion sensor data-driven system is used to collect motion data from badminton athletes and to recognize different badminton actions. The general work principle for the system is that data collected by the inertial measurement unit (IMU) of the WSD is sent to a mobile device using BLE communications. Once the mobile device receives the data, the motion data (e.g., raw motion data) is sent by the mobile device to the remote server via cloud technology. Accordingly, processor-based systems (e.g., smartphone 121) of a motion sensor data processing platform of the motion sensor-data driven system of the exemplary implementation execute a mobile app that can visualize results and upload data a cloud server (e.g., server 123) of the motion sensor data processing platform. The cloud server of the motion sensor data processing platform of the exemplary implementation uses machine-learning algorithms to accurately classify different racket sport sports actions (e.g., at 97% prediction accuracy in one experiment). Moreover, the machine-learning algorithms used by the cloud server of the motion sensor data processing platform of the exemplary implementation can accurately discriminate skill levels between professional athletes and amateurs in term of different actions (e.g., reaching a high prediction accuracy of 83.3% for smashes and 90% for clears in one experiment). After the motion data is collected and processed, users (e.g., athletes, coaches, trainers, etc.) may view data (e.g., data regarding the particular badminton actions performed, data regarding assessment of the badminton actions, etc.) regarding the athlete under observation, such as using the aforementioned mobile app (e.g., using smartphone 121) and/or a suitable client application (e.g., using computer 122).

Although the motion sensor data-driven system of the exemplary racket sport implementation is described with reference to badminton, it should be appreciated that the exemplary motion sensor data-driven system can be extended to recognize actions and analyze skill levels of athletes in other racket sports. For example, racket sport motion sensor data-driven systems may be implemented in accordance with concepts of the present invention for tennis, racket ball, table tennis, paddleball, squash, etc. Further, although the motion sensor data-driven system of the exemplary racket sport implementation is described with reference to collecting movement data for one athlete under observation for simplifying the discussion herein, it should be appreciated that motion data with respect to multiple athletes (e.g., a team of athletes) may be collected and processed (e.g., using an instance of the WSD for each athlete and one or more instances of the motion sensor data processing platform) for sports action recognition and/or assessment according to embodiments.

The exemplary racket sport motion sensor data-driven system includes a wireless IMU configuration of WSD 110 comprising a microprocessor with Bluetooth wireless communication module, a MEMS motion sensor, an on/off switcher, and a coin cell battery (e.g., disposed on the back of the circuit board shown in FIG. 2B). For example, the microprocessor with Bluetooth wireless communication module may comprise a fully integrated radio transceiver and baseband processor for Bluetooth low energy, which saves space for communication and processing and enables a small and power efficient Bluetooth smart system to communicate with the motion sensor and send motion data to the peripheral mobile device. The microprocessor of the exemplary embodiment was programmed to perform functions as described herein using available Software Development Kits (SDK). With regard to the MEMS motion sensor, it has been determined that a 16 g sensor range is sufficient to analyze the badminton actions of interest. Therefore, WSD 110 of the exemplary racket sport motion sensor data-driven system utilizes a single MEMS system providing a suitable sensor range (16 g) and small size (2.5 mm×3.0 mm×0.83 mm). Using the forgoing MEMS motion sensor and microprocessor with Bluetooth wireless communication module configuration, the overall size of µIMU 210 of WSD 110 used in the exemplary racket sport motion sensor data-driven system is provided within an 18 mm×17 mm package that weighs only 2.2 g.

Image capture device 140 of the exemplary racket sport motion sensor data-driven system is utilized for several purposes. For example, it provides validation for the inertial information received from sensors, and for auto-segmentation in the data processing. Accordingly, a number of parameters including frame rate, image resolution, exposure time (shutter speed), sensitivity, bit depth, color or monochrome, and camera interface were considered in selecting a camera for use as image capture device 140. In light of the foregoing, and understanding that the playing approach of athletes varies, a high-speed camera, which is capable of freezing fast moving objects in an indoor sports center environment as well as providing high definition, was selected for use in the exemplary racket sport motion sensor data-driven system.

A software application was written for execution on smartphone 121 of the exemplary racket sport motion sensor data-driven system to receive and visualize the IMU data collected from WSD 110. The mobile application was based on the Evothings framework, a development tool to create the mobile apps for Internet of Things (IoT). It is an open-source software developed with Java Script programming language. The software that was developed can be divided into several modules including BLE connection, sensor data display, and sensor data cloud. The BLE connection module was based on Evothings and Cordova BLE Plugin that implements BLE support for Android, IOS, and Windows 8.1.

The exemplary racket sport motion sensor data-driven system adopts a cloud-based module (e.g., cloud-based application executing on one or more server systems) to save the data received from WSD 110 into server 123. This distributed system configuration also supports building a cloud-based racket sports actions database for the use of other researchers. In the module of the exemplary racket sport motion sensor data-driven system, the Cordova HTTP plugin was used to recognize the cloud saving function. In operation according to embodiments, once the data collecting process ends, any user can look up the sensor data by visiting a designated website.

Experimental operation of the exemplary racket sport motion sensor data-driven system was conducted at HU FA KUANG Sport Centre in City University of Hong Kong. For the experiment, twelve right-handed male badminton athletes, including four amateurs, four sub-elites and four elite badminton athletes, were recruited. The demographics and physical information for the badminton athletes recruited for providing athletes under observation in the experimental operation of the exemplary racket sport motion sensor data-driven system are shown in the table below. With regard to the categories of badminton athletes recruited, elite players represented their region and had played in international competitions more than 10 times, sub-elite players played in local competitions but had no experience playing in international competitions, and amateurs are badminton beginners who have never played in competitions. As badminton is a wrist-based limb stroke sport, each right-handed athlete wore WSD 110 on their right wrist when performing badminton basic training. Such configuration was found to be comfortable and unobtrusive (e.g., the sensor facilitated collection of relevant inertial information without obstruction to the athletes' performance). A motion capture system comprising image capture device 140 was operated to capture images to validate the timing of sensor data.

| SUBJECT | AGE | HEIGHT | BODY MASS |
| --- | --- | --- | --- |
| Elite A | 22 | 184 cm | 80 kg |
| Elite B | 25 | 179 cm | 74 kg |
| Elite C | 22 | 175 cm | 68 kg |
| Elite D | 21 | 182 cm | 75 kg |
| Sub-elite A | 29 | 175 cm | 74 kg |
| Sub-elite B | 26 | 180 cm | 76 kg |
| Sub-elite C | 25 | 174 cm | 70 kg |
| Sub-elite D | 22 | 176 cm | 69 kg |
| Amateur A | 25 | 183 cm | 70 kg |
| Amateur B | 26 | 179 cm | 71 kg |
| Amateur C | 28 | 174 cm | 74 kg |
| Amateur D | 23 | 170 cm | 64 kg |

Figure 3:
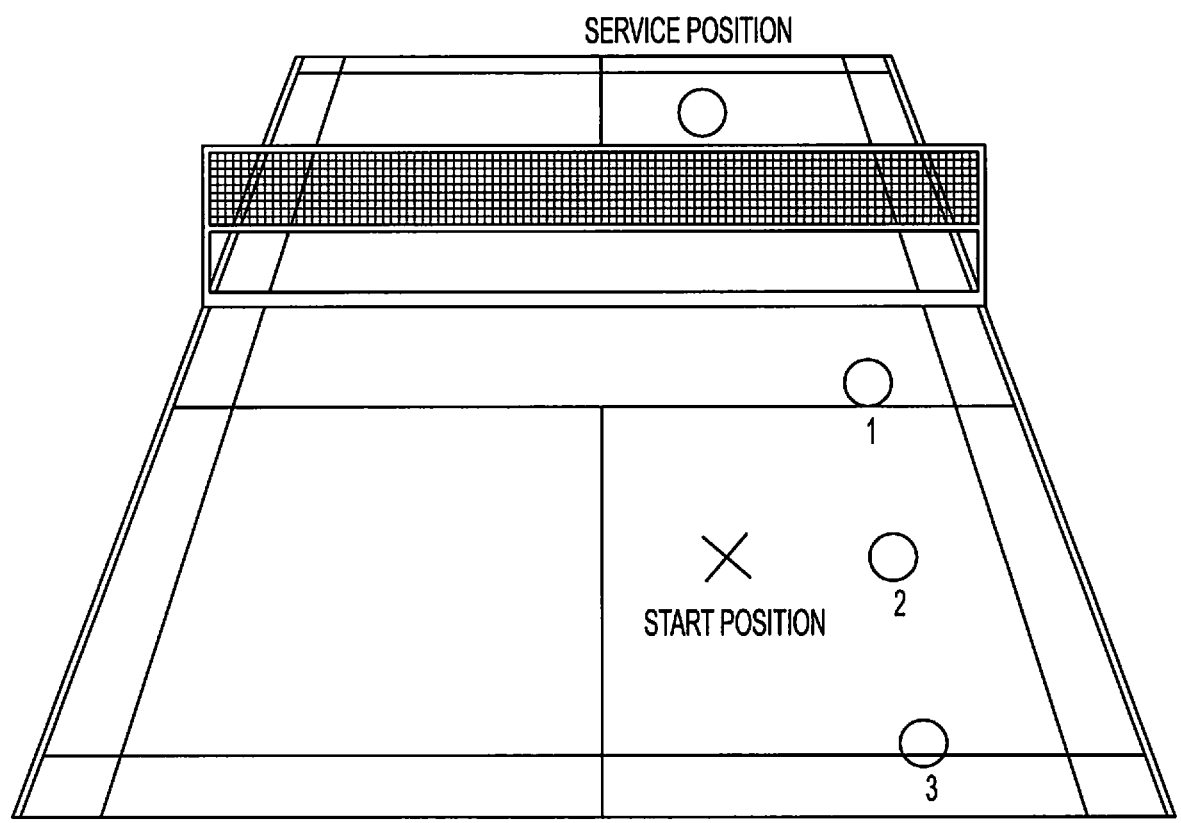
FIG. 3 shows athletes' positions for a racket sport experimental implementation of a motion sensor data-driven system of embodiments of the present invention.
Figure 4A:
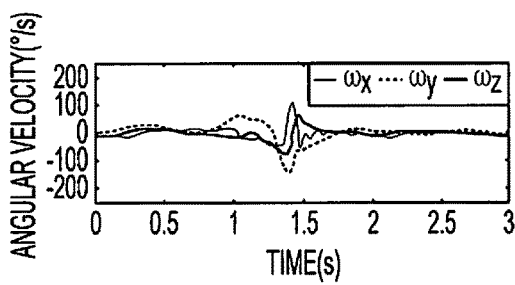
FIGS. 4A-4F show sensor data recorded by a wearable sensor device during smashes performed during experimental operation of a racket sport experimental implementation of a motion sensor data-driven system of embodiments of the present invention.
Figure 4B:
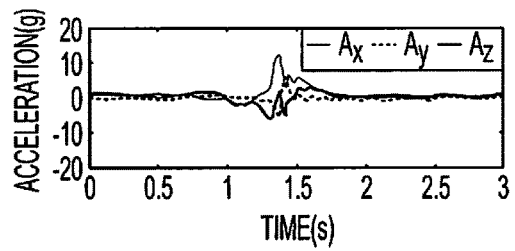
Figure 4C:
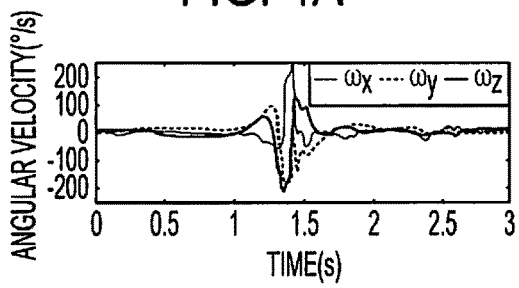
Figure 4D:
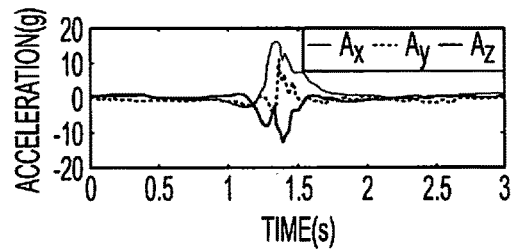
Figure 4E:
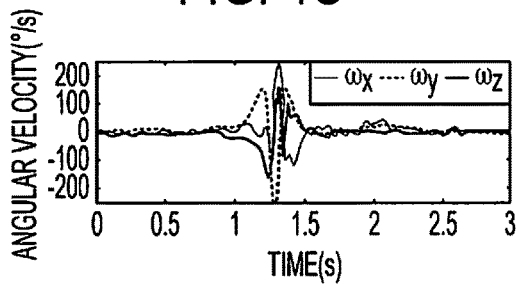
Figure 4F:
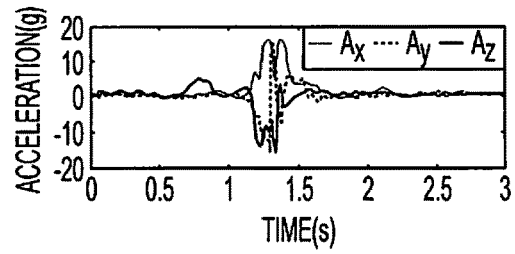

In the experiment, after a 20-minute warmup supervised by a professional coach, each athlete performed 20 straight smashes, short drops, and long clears, respectively. As shown in FIG. 3, during the experiment the coach served the shuttlecock to position 1 (for drops), position 2 (for smashes), and position 3 (for clears). The athlete under observation performed the actions at these different positions, wherein every athlete had to hit the shuttlecock to the destination inside the right half court in order for the action to count as a successful action.

FIGS. 4A-4F show sensor data recorded by WSD 110 at athletes' wrists during smashes performed during experimental operation of the exemplary racket sport motion sensor data-driven system. In particular, FIGS. 4A-4F show the six-axis synchronized raw data from the athletes at different levels, wherein graphs of the measured angular velocities (FIG. 4A) and accelerations (FIG. 4B) of the amateur athletes, angular velocities (FIG. 4C) and accelerations (FIG. 4D) of the sub-elite athletes, and angular velocities (FIG. 4E) and accelerations (FIG. 4F) of the elite athletes are shown.

Figure 5A:
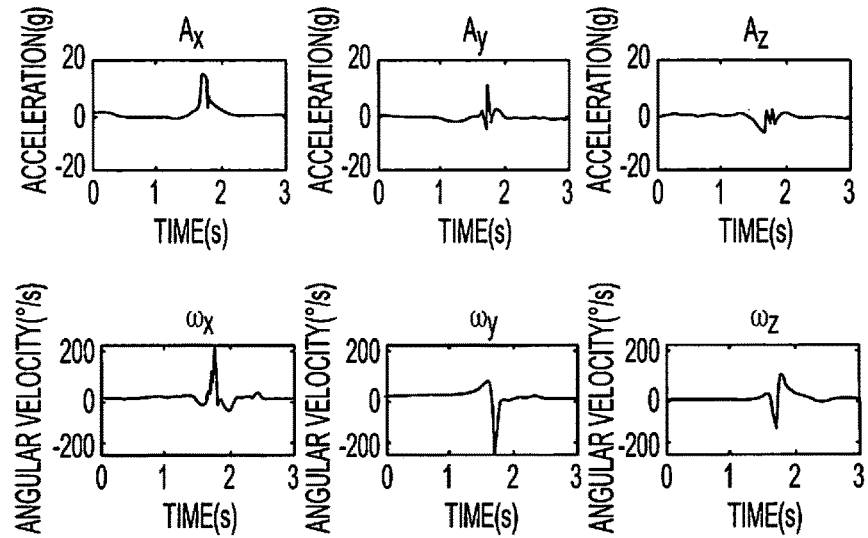
FIGS. 5A-5C show raw data captured by a wearable sensor device during operation of a racket sport experimental implementation of a motion sensor data-driven system of embodiments of the present invention.
Figure 5B:
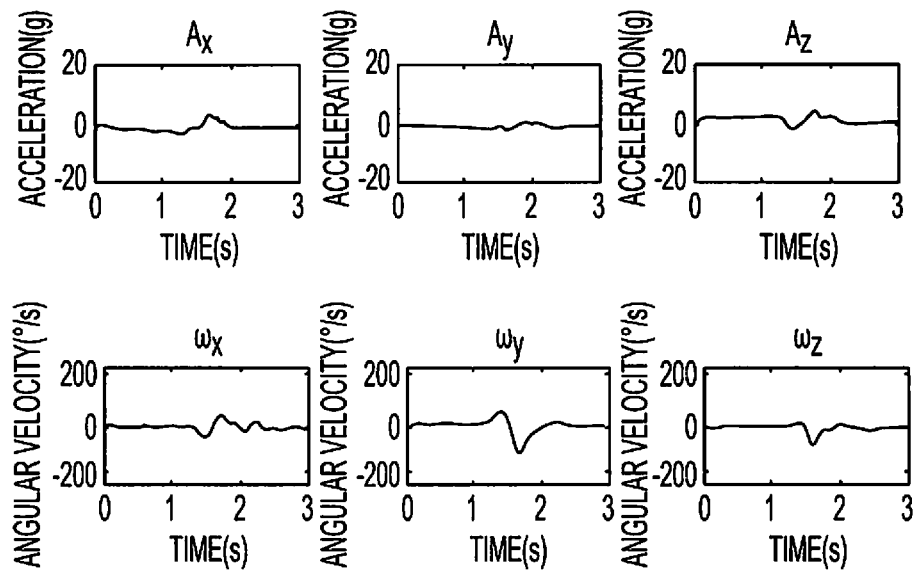
Figure 5C:
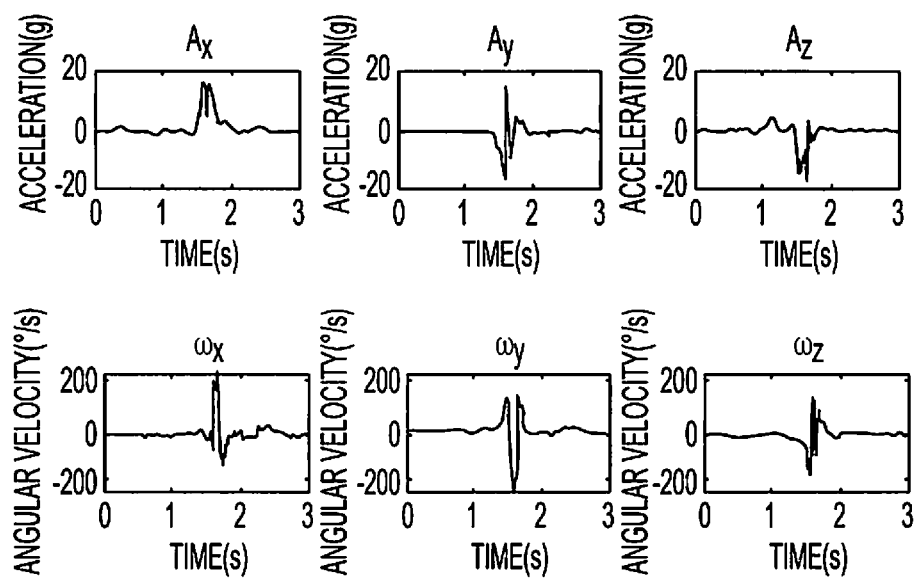

FIGS. 5A-5C show raw data captured by WSD 110 during experimental operation of the exemplary racket sport motion sensor data-driven system. In particular, FIG. 5A shows the angular velocity and acceleration from a clear action performed by an athlete under observation, FIG. 5B shows the angular velocity and acceleration from a drop action performed by an athlete under observation, and FIG. 5C shows the angular velocity and acceleration from a smash action performed by an athlete under observation.

Figure 6:
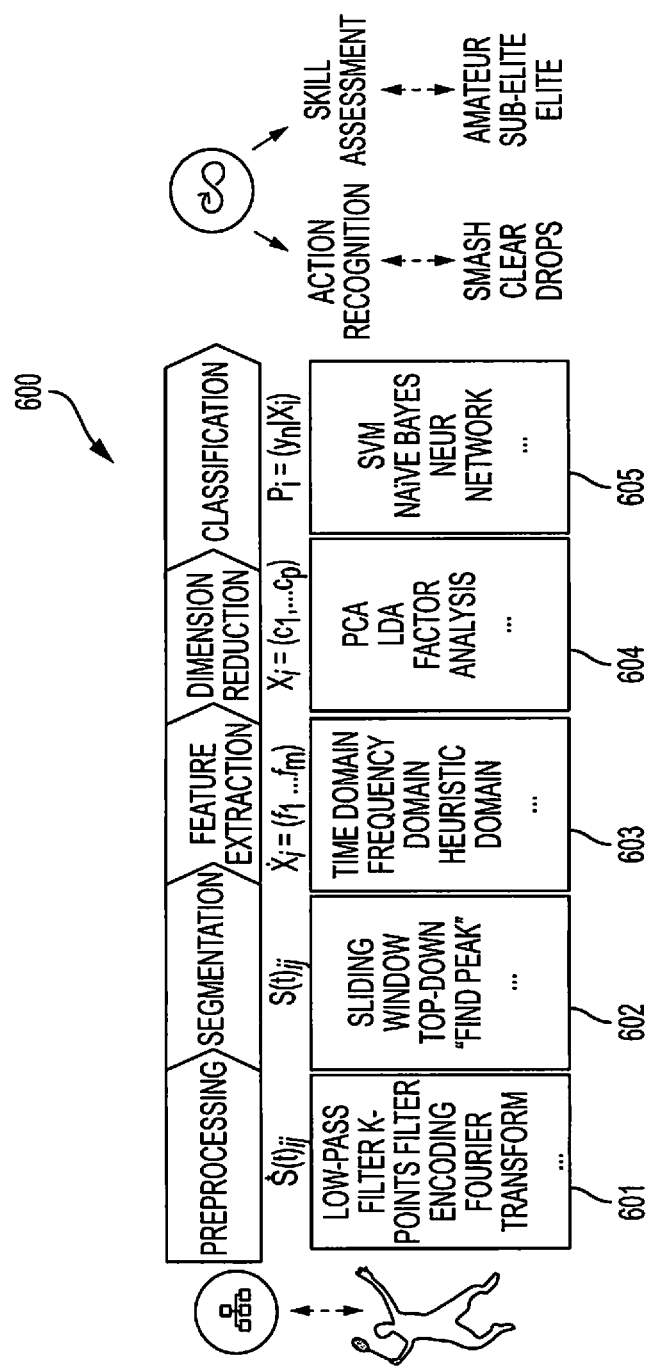
FIG. 6 shows a machine learning data processing method as may be implemented by a motion sensor data-driven system of embodiments of the present invention.

In operation of the exemplary racket sport motion sensor data-driven system in the experiment, movement data (e.g., as represented in FIGS. 4A-4E and 5A-5C) for the recruited athletes was obtained by WSD 110, reported to smartphone 121, and provided to server 123 for processing. Server 123 implemented a machine learning data processing method as shown in FIG. 6 in providing badminton actions recognition and/or skill level assessment for the experimental operation of the exemplary racket sport motion sensor data-driven system. In particular, FIG. 6 shows data processing flow 600 as may be implemented by one or more processor-based system of motion sensor data processing platform 120 (e.g., server 123) to recognize badminton actions and provide skill level assessment from motion data provided by a single sensor configuration of WSD 110. The data processing framework illustrated in FIG. 6 includes preprocessing logic 601, segmentation logic 602, feature extraction logic 603, dimensionality reduction logic 604, and classification logic 605. It should be appreciated that each stage of the data processing framework may be implemented using a variety of methods. For example, classification methods such as SVM, k-NN, Naïve Bayes, NN, and/or Decision Tree may be implemented with respect to classification logic 605. To demonstrate performance in the experimental implementation of the exemplary racket sport motion sensor data-driven system, a SVM classifier was implemented for classification logic 605.

In the data preprocessing performed by the exemplary racket sport motion sensor data-driven system, data points associated with the athlete under observation failing to hit the shuttlecock inside the target area were removed. The remaining raw data $\dot{S}(t)_{ij}$ from each recruited athlete was provided to server 123 for performing the operations of data processing flow 600.

In performing preprocessing according to preprocessing logic 601, filtering is applied to the raw data $\dot{S}(t)_{ij}$ to obtain a clearer $S(t)_{ij}$ signal. In the experimental implementation, a 3-point filter (e.g., low-pass filter, K-points filter, and encoding Fourier transform) moving average was applied to reduce the effect of noise and obtain a clearer $S(t)_{ij}$ signal.

Segmentation is provided by segmentation logic 602 for extracting statistical and morphology features from the filtered signal $S(t)_{ij}$. For example, segmentation was provided according to the experimental implementation by finding the peak of the signal using a sliding window top-down technique. It should be appreciated that such window-based techniques are capable of realizing real-time data processing, see e.g., G. Okeyo, et al., "Dynamic Sensor Data Segmentation for Real-Time Knowledge-Driven Activity Recognition," the disclosure of which is incorporated herein by reference. In operation provided by the experimental implementation each segmented dataset $\dot{X}_i = (f_1 \ldots f_m)$ was merged into a large matrix X.

In operation of feature extraction logic 603 in the experimental implementation, statistical and morphological features are extracted as inputs for sports actions recognition and/or assessment. For example, in operation of the experimental implementation, 18 features, including 15 statistical features and 3 morphological features, were extracted from the segmented data matrix to provide extracted feature datasets $X_i=(c_1 \ldots c_p)$ as inputs for badminton actions recognition and classification. The table below details the statistical and morphological features utilized in the experimental implementation of the exemplary racket sport motion sensor data-driven system. As can be appreciated from the details shown in the table below, the extracted features include time domain, frequency domain and heuristic domain features (e.g., mean and variance from the six axes and root mean square (RMS) from three acceleration axes, maximum acceleration in x-axis, 3-axis acceleration data, and 3-axis angular velocity data). In operation according to the experimental implementation, a badminton actions (smashes, clears and drops) database was compiled from the data provided inertial sensor.

| NO. | SYMBOL | DESCRIPTION |
| --- | --- | --- |
| 1 | $A_{AX}$ | Mean value of acceleration from x axis |
| 2 | $A_{AY}$ | Mean value of acceleration from y axis |
| 3 | $A_{AZ}$ | Mean value of acceleration from z axis |
| 4 | $D_{AX}$ | Variance of acceleration from x axis |
| 5 | $D_{AY}$ | Variance of acceleration from y axis |
| 6 | $D_{AZ}$ | Variance of acceleration from z axis |
| 7 | $A_{GX}$ | Mean value of angular velocity from x axis |
| 8 | $A_{GY}$ | Mean value of angular velocity from y axis |
| 9 | $A_{GZ}$ | Mean value of angular velocity from z axis |
| 10 | $D_{GX}$ | Variance of angular velocity from x axis |
| 11 | $D_{GY}$ | Variance of angular velocity from y axis |
| 12 | $D_{GZ}$ | Variance of angular velocity from z axis |
| 13 | $M_{AX}$ | The maximum acceleration from the x-axis |
| 14 | $M_A$ | The magnitude of the 3-axis acceleration |
| 15 | $M_G$ | The magnitude of the 3-axis angular velocity |
| 16 | $RMS_{AX}$ | Root mean square of acceleration from x axis |
| 17 | $RMS_{AY}$ | Root mean square of acceleration from y axis |
| 18 | $RMS_{AZ}$ | Root mean square of acceleration from z axis |

Dimension reduction is provided by operation of dimension reduction logic 604 to alleviate computing load and/or bandwidth requirements associated with the data processing by the exemplary racket sport motion sensor data-driven system. For example, in the experimental implementation of the exemplary racket sport motion sensor data-driven system, principle components were identified to alleviate the computing load and bandwidth requirements during communication with the cloud server. Dimension reduction logic 604 of the experimental implementation utilized principle component analysis (PCA) to process the data before classification because PCA shows better performance compared to nonlinear dimensionality reduction, see e.g., Y. Bengio, et al., "Out-of-Sample Extensions for LLE, Isomap, MDS, Eigenmaps, and Spectral Clustering," the disclosure of which is incorporated herein by reference.

In implementing PCA for dimension reduction according to the experimental implementation, it should be appreciated that the eighteen features of the experimental implementation extracted from the raw badminton actions data may be expressed as vectors, where $f=[f_1, f_2, \ldots f_{18}]$. Linear combinations of these original features and can be expressed as $f_n=[f_{n1}, f_{n2}, \ldots f_{nm}]$, where m represents the dimension to be reduced:

$$f_m = a_{i1}f_1 + a_{i2}f_2 + \ldots a_{mi}f_m \tag{1}$$

where $a_{ij}$ are eigenvalues of the covariance matrix. As there is only one node, equation (1) can be simplified to $$f_m = a_1 f_1 + a_2 f_2 + \ldots a_m f_m \tag{2}$$

Classification logic 605 analyzes the dimensionally reduced data for recognizing various sports actions represented by the data. In operation to provide classification by the experimental implementation, a SVM classifier, providing a supervised learning algorithm used for solving a binary classification problem, was implemented for classification logic 605. It should be appreciated that SVM exhibits some distinct advantages (see e.g., W. M. Campbell, et al., "Support Vector Machines using GMM Supervectors for Speaker Verification," the disclosure of which is incorporated herein by reference) such as good generalization ability, and robustness by free choice of model parameters in processing high dimensional and linear inseparable problems over other supervised learning algorithms, such as Nave Bayes and Linear discriminant analysis. SVM is also suitable to the example implementation because there are some intersections for clears and smashes action (e.g., the patterns are similar), thus presenting a linear inseparable problem.

In the experimental implementation of the exemplary racket sport motion sensor data-driven system, in light of there being three labels (e.g., smash, clear, and drop), a one-versus-one strategy (see e.g., E. Approaches, et al., "Multiclass from Binary; Expanding One-Versus-All," the disclosure of which is incorporated herein by reference) in which three SVMs are constructed using corresponding data from the other two classes and then a voting scheme is applied. This may be presented as a binary classification problem solved by SVM given a training data set $T=\{(X, y_i | X \in R^m, y_i \in \{1, -1\})\}_{i=1}^n$ where, X is a m-dimensional matrix; $y_i$ is a binary label, which belongs to either 1 or −1; n is the total number of samples; and i is the current sample number. Using SVM, the training data set may be mapped into a higher-dimensional feature space and then classified with hyperplanes. The problem that finds the maximum margin hyperplane (MMH) can be converted to an optimization problem that can be described as follows:

$$\operatorname*{argmin}_{\omega, b} \frac{1}{2} \|\omega\|^2 \tag{3}$$

$$\text{s.t. } y_i(\omega \cdot x_i - b) \geq 1, i = 1, \ldots, n$$

where ω is a normal vector of a hyperplane and b is an offset of a hyperplane from the origin along the normal vector. According to the Lagrangian multipliers under the Karush-Kuhn-Tucker (KKT) conditions, equation (3) can be reformulated as follows:

$$L(\omega, b, \alpha) = \tfrac{1}{2}\|\omega\|^2 - \Sigma_{i=1}^{n=270} \alpha_i \{[y_i(\omega^T \cdot x_i + b) - 1]\} \tag{4}$$

where α represents the Lagrangian multipliers vector. The derivative of equation (4) with respect to ω results in:

$$\omega = \Sigma_{i=1}^{n=270} \alpha_i y_i x_i \tag{5}$$

the derivative of (4) with respect to b results in:

$$\Sigma_{i=1}^{n=270} \alpha_i y_i = 0 \tag{6}$$

substituting equations (5) and (6) into equation (4), a simplified Lagrangian dual problem may be obtained as follows:

$$\operatorname*{argmax}_{\alpha} \sum_{i=1}^{n=270} \alpha_i - \frac{1}{2}\sum_{i=1}^{n=270} \alpha_i\alpha_j y_i y_j x_i x_j \quad (7)$$

s.t $\alpha_i \geq 0, i = 1, \ldots, n$ $$\sum_{i=1}^{n=270} \alpha_i y_i = 0$$

Since there is some overlapping data from clears and smash actions, which means that the badminton actions example is not linear separable, a slack variable ξi and an error penalty constant C may be added to find a tradeoff between a large margin and an error penalty. Following the aforementioned procedure, the simplified Lagrangian dual problem may be obtained in the case of non-linear separable problems as:

$$\operatorname*{argmax}_{\alpha} \sum_{i=1}^{n=270} \alpha_i - \frac{1}{2}\sum_{i=1}^{n=270} \alpha_i\alpha_j y_i y_j \Phi(x_i x_j) \quad (8)$$

s.t. $C \geq \alpha_i \geq 0, i = 1, \ldots, n$ $$\sum_{i=1}^{n=270} \alpha_i y_i = 0$$

By using a Sequential Minimal Optimization (SMO) algorithm (see e.g., S. S. Keerthi, et al., "SMO Algorithm for Least-Squares SVM Formulations", the disclosure of which is incorporated herein by reference), the Lagrange multipliers $\alpha_i$ may be obtained. According to equation (4), the final ω may be calculated and an optimization hyperplane may be found. The decision function for classification utilized in the experimental implementation is:

$$d(X^T) = \operatorname{sgn}[\Sigma_{i=1}^{n=90}\alpha_i j_i \Phi(x_i x_j) - b] \quad (9)$$

where $y_i$ refers to the class label of a support vector; $\alpha_i$ and $b_o$ refer to two constants; and λ refers to the testing set of badminton actions samples whose labels are $y_i$.

In the experimental implementation of the exemplary racket sport motion sensor data-driven system, 360 datasets were collected from 12 athletes under observation, each of whom performed 30 trials for three different badminton actions. Nine athlete's datasets (270 datasets) were used for the training, and the remainder of the datasets (90 datasets) from a different three athletes under observation were used for testing classifier performances. During the training process, 10-fold cross validation was used to avoid the overfitting problem and find the best parameters of the SVM classifier.

To investigate the influence of parameters on classification performance, some parameters of SVM, as shown in the table below, were randomly chosen for testing. Accordingly, in testing classifier performances C values ranging from 1 to 50000, Gamma values ranging from 0.0001 to 0.1, and several different types of kernels were compared. The experimental implementation achieved the best classifier performance when C=1, and when using the linear kernel function.

| PENALTY PARAMETER (C) | GAMMA | KERNEL |
|---|---|---|
| 1 | 0.0001 | Linear |
| 100 | 0.0005 | Polynomial |
| 1000 | 0.001 | RBF |
| 5000 | 0.005 | Sigmoid |
| 10000 | 0.01 | |
| 50000 | 0.1 | |

The table below shows the average classification results when using SVM following PCA (SVM+PCA). As shown in the data of the table below, the recognition accuracies for three different actions (Clears, Drops, and Smash) are 91%, 100% and 100%, respectively, in operation of the experimental implementation of the exemplary racket sport motion sensor data-driven system. This result demonstrates clear distinction between different actions. On average, the precision of classifying different actions can reach 97%, which means systems implemented in accordance with concepts of the present invention are highly effective with respect to sports action recognition using a wearable sensor.

| ACTIONS | PRECISION | RECALL | F1-SCORE |
|---|---|---|---|
| Clears | 91% | 1.00 | 0.95 |
| Drops | 100% | 1.00 | 1.00 |
| Smash | 100% | 0.90 | 0.95 |
| AVERAGE | 97% | 0.97 | 0.97 |

To determine whether SVM+PCA provided the best classifier for the data of the experimental implementation for badminton action recognition (e.g., recognition of clear, drop, and smash strokes), kNN non-parametric classifier and NB classifier were compared, as shown in the table below. In this comparison, different k values (from 1 to 11) were tested to find the best estimator for the experimental data, achieving—the best model results when k=5. The results from testing these two other algorithms demonstrated that the computational efficient PCA+SVM is also sufficiently accurate.

| CLASSIFICATION ALGORITHM | PARAMETERS | ACCURACY |
|---|---|---|
| SVM + PCA | C = 1, GAMMA = 0.0001 | 97% |
| SVM | C = 1, GAMMA = 0.0001 | 94% |
| Nearest Neighbor | K = 5 | 94% |
| Naïve Bayes | N.A. | 90% |

Sports action assessment was provided using the experimental implementation using analysis similar to that above by changing the label from different actions to different skill levels. In particular, three different levels (e.g., elite, sub-elite, and amateur) were labeled for constructing SVMs of the experimental implementation. Nine athlete's datasets (90 datasets) were used for the training, and the remainder of the datasets (30 datasets) from a different three athletes under observation were used for testing classifier performances. 10-fold cross validation was used again to avoid the overfitting problem and find the best parameters of the SVM classifier. This was repeated 64 times to ensure that all possible combinations of testing sets with three subjects of different skill levels were covered. The three tables below show the skill assessment results in terms of different actions. As shown in the first of the three tables below, the recognition accuracy of elite, sub-elite, and amateur athletes through smash strokes are 100%, 70% and 80% respectively. For skill assessment of clear strokes as shown in the second of the three tables below, the average classification precision is 90.3%, which demonstrates clear distinction in performance between amateurs to elites. On the contrary however, the classification accuracy of skill level from wrist motion during drop stokes is very low, particularly for sub-elite and amateur athletes, as shown in third of the three tables below.

| SKILL LEVEL | PRECISION | RECALL | F1-SCORE |
|---|---|---|---|
| Elite | 100% | 0.90 | 0.87 |
| Sub-elite | 70% | 0.77 | 0.74 |
| Amateurs | 80% | 0.78 | 0.89 |
| AVERAGE | 83.3% | 0.82 | 0.83 |
| Elite | 100% | 1.00 | 1.00 |
| Sub-elite | 82% | 0.90 | 0.86 |
| Amateurs | 89% | 0.80 | 0.84 |
| AVERAGE | 90.3% | 0.90 | 0.90 |
| Elite | 100% | .45 | 0.62 |
| Sub-elite | 0% | 0.00 | 0.00 |
| Amateurs | 0% | 0.00 | 0.00 |
| AVERAGE | 33% | 0.15 | 0.21 |

To determine whether SVM+PCA provided the best classifier for the data of the experimental implementation for badminton skill assessment (e.g., recognition of elite, sub-elite, and amateur levels), kNN non-parametric classifier and NB classifier were compared, as shown in the two tables below. In this comparison, different k values (from 1 to 11) were tested to find the best estimator for the experimental data, achieving—the best model results when k=5 (smash) and k=7 (clear). The results for smash and clear are listed only, because the average accuracy of assessing skill levels in drops is very low. Again, PCA+SVM shows advantages in dealing with a linear inseparable problem over kNN and NB classifiers.

| CLASSIFICATION ALGORITHM | PARAMETERS | ACCURACY |
|---|---|---|
| SVM + PCA | C = 1, GAMMA = 0.001 | 83.3% |
| SVM | C = 1, GAMMA = 0.001 | 74% |
| Nearest Neighbor | K = 5 | 78% |
| Naïve Bayes | N.A. | 78% |
| SVM + PCA | C = 1, GAMMA = 0.001 | 90% |
| SVM | C = 1, GAMMA = 0.001 | 86% |
| Nearest Neighbor | K = 7 | 82% |
| Naïve Bayes | N.A. | 84% |

As can be appreciated from the foregoing, the experimental implementation of the exemplary racket sport motion sensor data-driven system can automatically provide data statistics of badminton players, which can help coaches and athletes themselves to learn about real condition changes during a match or a training session. Classification results of the action recognition provided by the experimental system strongly support the assumption that wrist motion is crucial in badminton playing and shows that different strokes invoke distinct wrist motion in execution.

With respect to the skill assessment system provided by the experimental implementation of the exemplary racket sport motion sensor data-driven system, test samples from elite athletes are recognized precisely, showing that the elite athletes have a distinctive motion compared to the other two groups in all strokes. It is thus feasible to identify level or performance from wrist motion data of smash and clear. Based on the results thus far, it is believed that elite athletes could be identified by observing only their clear strokes. However, drop strokes are relatively flexible. Amateur athletes and sub-elite athletes play similarly while elite athletes' drop strokes are consistently different from those of amateur and sub-elites. Using systems like that of the experimental implementation of the exemplary racket sport motion sensor data-driven system, a database of badminton action movements may be compiled from players at different levels, which can then be used by sports scientists and professional coaches for further study and research.

Having described a motion sensor data-driven system of embodiments of the invention configured for use with respect to a racket sport (e.g., badminton) above, an exemplary implementation of a motion sensor data-driven system configured for use with respect to a non-racket sport (e.g., volleyball) is described below to further aid in understanding the concepts of the present invention. The motion sensor data-driven system of this exemplary implementation provides a relatively inexpensive training tool, requiring much less computational power than conventional videography, for analysis in monitoring motions of non-racket sports athletes during sports actions.

In volleyball, for example, spiking is the predominant skill used by a team when attacking. Despite consisting of a number of movement components, from a coach's viewpoint, the basic spiking action is relatively easy to teach because the movements used are similar to those in other popular sports (e.g., baseball and tennis). However, it is difficult to master and execute the spiking movements consistently. Accordingly, learning proper spiking action efficiently has been a major concern to both players and coaches.

During each spike, the spiker generates the momentum imparted to the ball. A series of factors could influence the spike efficiencies, such as the linear velocity of the spiker in the direction of the spike, the spiker's torso rotation, arm swing and wrist snap, the downward velocity of the spiker, the velocity of the spiker before contacting the ball, and the mass and rigidity of the spiker's hand, see e.g., E. Roque, et al., "Volleyball Coaching Manual," the disclosure of which is incorporated herein by reference. In addition to these biomechanical factors, a reasonable spiking action and posture can reduce injury and improve performance, see e.g., D. K. Arvind, et al., "The Speckled Golfer," the disclosure of which is incorporated herein by reference. The foregoing factors may be translated two key principles in execution (see e.g., K. Bonnie, "Volleyball: Steps to Success, Human Kinetics," the disclosure of which is incorporated herein by reference): The line of force for a right-handed spiker moves from the contact point between the hand and ball down the arm through the center of gravity and, finally, down into the athlete's left leg; and A spiker who hits the ball is supposed to use the "topspin" technique, which takes advantage of the Magnus effect.

The exemplary motion sensor data-driven system of the exemplary non-racket sport implementation adopts a local computing device configuration, as shown by FIG. 1B. In particular, the motion sensor data-driven system of the exemplary racket sport implementation comprises a sensor node (e.g., WSD 110), a high-speed camera (e.g., image capture device 140), a mobile device (e.g., smartphone 121), and a laptop (e.g., computer 122). It should be appreciated that, although the exemplary motion sensor data-driven system is shown in a local computing system configuration, embodiments of a non-racket sport implementation of a motion sensor data-driven system may be provided in a distributed configuration, such as that of FIG. 1A.

Figure 7:
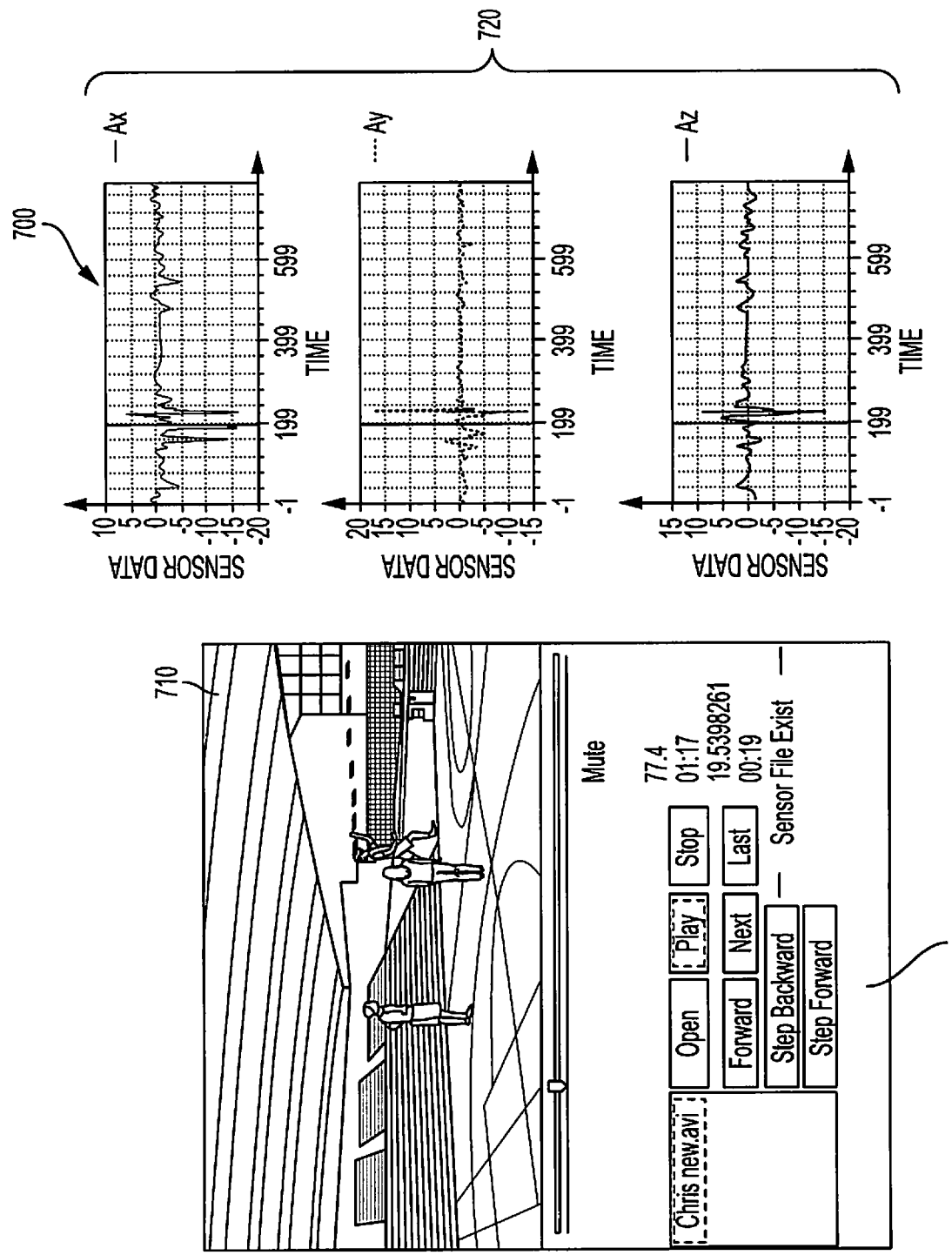
FIG. 7 shows a software interface display screen of a non-racket sport experimental implementation of a motion sensor data-driven system of embodiments of the present invention.

The non-racket sport implementation of the exemplary implementation of the motion sensor data-driven system utilizes a wireless WSD with an overall size of 18 mm×16 mm×2 mm, consistent with configurations shown in FIGS. 2A and 2B, to collect inertial data. In operation, the exemplary racket sport motion sensor data-driven system is used to collect motion data from volleyball athletes and to recognize one or more volleyball actions. The general work principle for the system is that data collected by the inertial measurement unit (IMU) of the WSD is sent to a processor-based system of the motion sensor data processing platform. In the exemplary racket sport implementation, WSD 110 utilizes a micro SD card to store motion data for athlete under observation 110, whereby the micro SD card is removed and transferred to computer 122 for processing, analysis, etc. Accordingly, processor-based systems (e.g., computer 122) of a motion sensor data processing platform of the motion sensor-data driven system of the exemplary implementation execute an application that can process the motion sensor data (e.g., using machine-learning algorithms to accurately classify different racket sport sports actions and/or accurately discriminate skill levels between professional athletes and amateurs in term of different actions) and visualize results, such as for use in providing training guidance. To visualize the collected motion data and associate them with the corresponding volleyball athletes' actions, a software interface developed using C# was provided in the exemplary non-racket sport implementation of the motion sensor data-driven system to allow users to replay both video (e.g., captured using image capture device 140) and sensing data (e.g., provided by WSD 110) simultaneously. As shown in software interface display screen 700 of FIG. 7, the interface of this exemplary implementation was divided into three modules, including media (e.g., represented by media module 710), sensor data display (e.g., represented by sensor data module 720), and synchronization (e.g., represented by synchronization module 730). After the motion data is collected and processed by the exemplary non-racket sport motion sensor data-driven system, users (e.g., athletes, coaches, trainers, etc.) may view data (e.g., data regarding the particular volleyball actions performed, data regarding assessment of the volleyball actions, etc.) regarding the athlete under observation, such as using the aforementioned processor-based systems (e.g., smartphone 121 and/or computer 122).

Although the motion sensor data-driven system of the exemplary non-racket sport implementation is described with reference to volleyball, it should be appreciated that the exemplary motion sensor data-driven system can be extended to recognize actions and analyze skill levels of athletes in other non-racket sports. For example, non-racket sport motion sensor data-driven systems may be implemented in accordance with concepts of the present invention for tetherball, American handball, etc. Further, although the motion sensor data-driven system of the exemplary non-racket sport implementation is described with reference to collecting movement data for one athlete under observation for simplifying the discussion herein, it should be appreciated that motion data with respect to multiple athletes (e.g., a team of athletes) may be collected and processed (e.g., using an instance of the WSD for each athlete and one or more instances of the motion sensor data processing platform) for sports action recognition and/or assessment according to embodiments.

The exemplary non-racket sport motion sensor data-driven system comprises a configuration of WSD 110 having a microprocessor, a MEMS motion sensor, an on/off switcher, a micro SD card interface, and a coin cell battery. For example, the microprocessor may be provided by a (MCU) which communicates with the motion sensor and stores the recordings to the microSD card. The microprocessor of the exemplary embodiment was programmed to perform functions as described herein using the Arduino development kit, an open-source electronics platform. With regard to the MEMS motion sensor, it has been determined that a 16 g sensor range is sufficient to analyze the volleyball actions of interest. Therefore, WSD 110 of the exemplary non-racket sport motion sensor data-driven system utilizes a single MEMS system, comprising a nine-axis MEMS motion sensor that provides both orientation (through a built-in gyroscope) and acceleration (through a built-in accelerometer) readings in x-y-z dimensions, for providing a suitable sensor range (16 g) and small size (3 mm×3 mm×1 mm). Using the forgoing MEMS motion sensor and microprocessor configuration, the overall size of μIMU 210 of WSD 110 used in the exemplary racket sport motion sensor data-driven system is provided within an 18 mm×16 mm×2 mm package.

Image capture device 140 of the exemplary racket sport motion sensor data-driven system is utilized for several purposes. For example, it provides validation for the inertial information received from sensors, and may be used for segmentation in the data processing. Accordingly, a number of parameters including frame rate, image resolution, exposure time (shutter speed), sensitivity, bit depth, color or monochrome, and camera interface were considered in selecting a camera for use as image capture device 140. In light of the foregoing, and understanding that the playing approach of athletes varies, a high speed camera, which is capable of freezing fast moving objects in an indoor sports center environment as well as providing high definition, was selected for use in the exemplary racket sport motion sensor data-driven system.

Experimental operation of the exemplary non-racket sport motion sensor data-driven system was conducted at Shek Kip Mei Stadium (in Kowloon Tong, Hong Kong). For the experiment, ten right-handed male volleyball athletes, including three amateurs, three sub-elites, and four elite volleyball athletes, were recruited. The demographics and physical information for the volleyball athletes recruited for providing athletes under observation in the experimental operation of the exemplary non-racket sport motion sensor data-driven system are shown in the table below. With regard to the categories of volleyball athletes recruited, elite players had represented their region with more than 10 non-local competitions, sub-elite players had played in local competitions but have no experience playing in non-local competitions, and amateurs were beginners in playing volleyball. As volleyball is a wrist-based limb stroke sport, each right-handed athlete wore WSD 110 on their right wrist when performing volleyball spikes. Such configuration was found to be comfortable and unobtrusive (e.g., the sensor facilitated collection of relevant inertial information without obstruction to the athletes' performance). A motion capture system comprising image capture device 140 was operated to capture images to validate the timing of sensor data.

| SUBJECT | AGE | HEIGHT | BODY MASS |
|---|---|---|---|
| Elite A | 22 | 194 cm | 85 kg |
| Elite B | 25 | 193 cm | 94 kg |
| Elite C | 22 | 193 cm | 86 kg |
| Elite D | 21 | 188 cm | 75 kg |
| Sub-Elite A | 29 | 188 cm | 86 kg |
| Sub-Elite B | 26 | 186 cm | 84 kg |
| Sub-Elite C | 25 | 186 cm | 82 kg |
| Amateur A | 25 | 183 cm | 70 kg |
| Amateur B | 26 | 179 cm | 71 kg |
| Amateur C | 28 | 180 cm | 74 kg |

Figure 8:
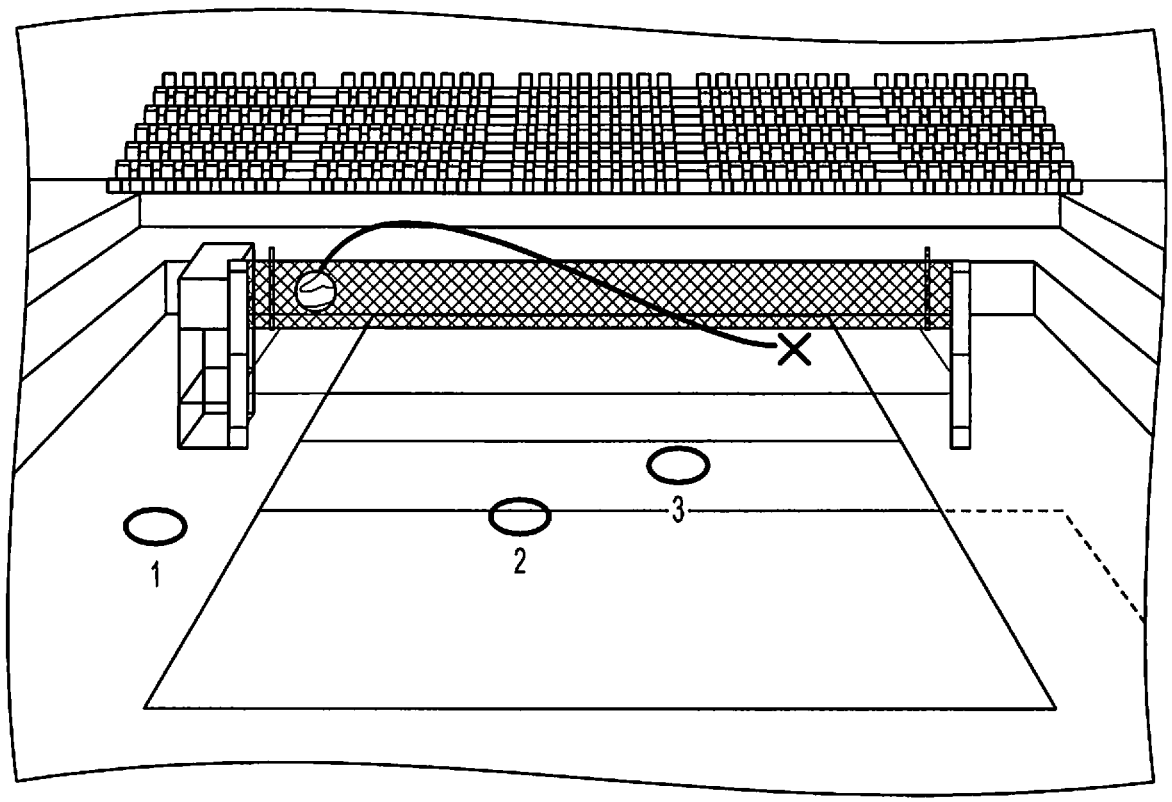
FIG. 8 shows athletes' positions for a non-racket sport experimental implementation of a motion sensor data-driven system of embodiments of the present invention.

In the experiment, after a 20-minute warmup supervised by a professional coach, each athlete performed 10 cross-court spikes using a straight-ahead spike motion. As shown in FIG. 8, during the experiment every athlete had to spike the ball toward the "x" position, otherwise the spike was not counted as a successful action.

Figure 9A:
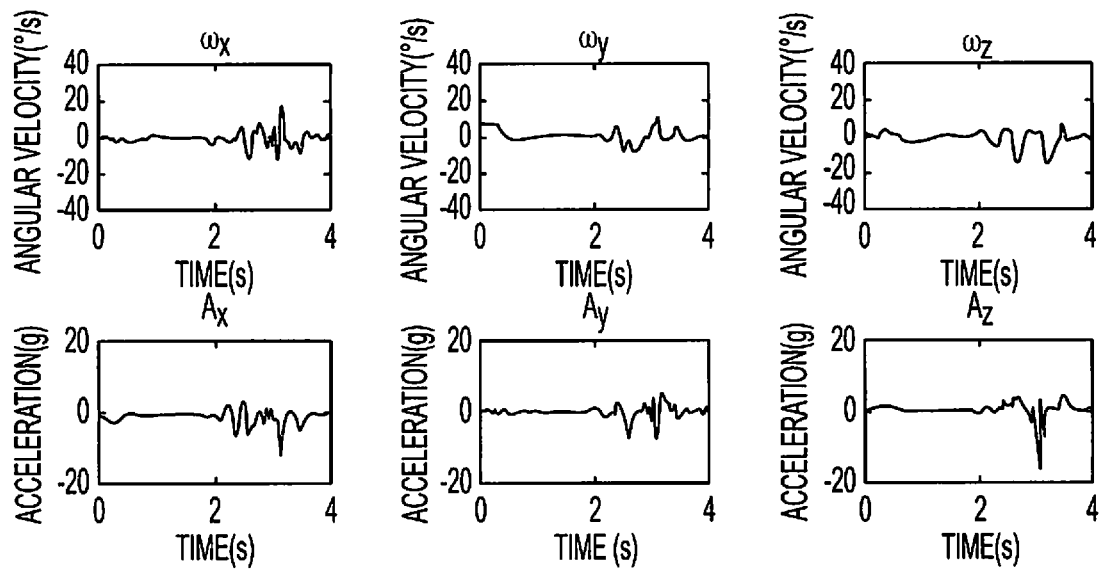
FIGS. 9A and 9B show raw data captured by a wearable sensor device during experimental operation of a non-racket sport experimental implementation of a motion sensor data-driven system of embodiments of the present invention.
Figure 9B:
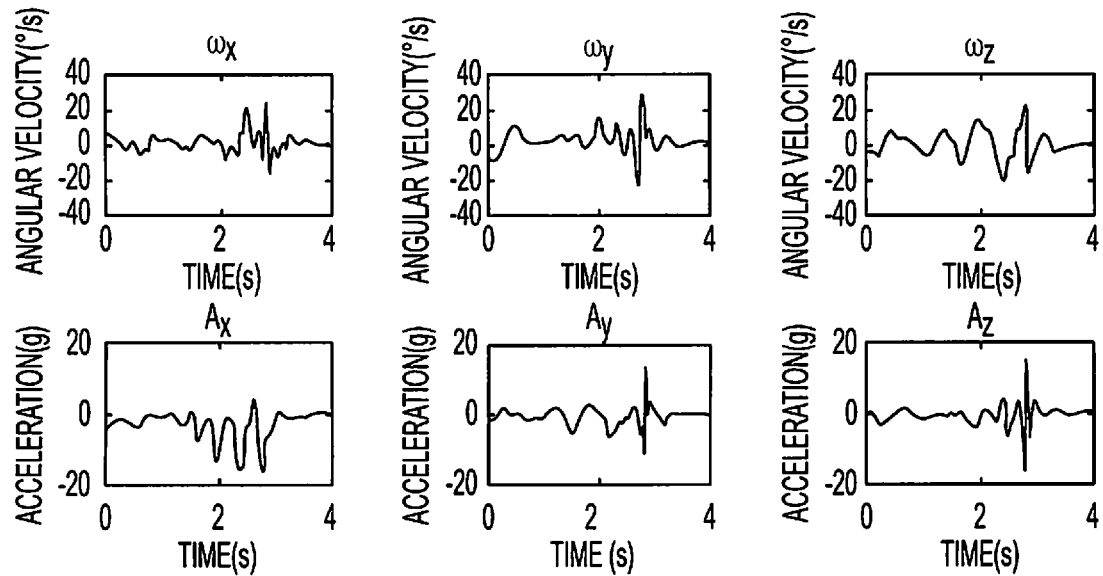
Figure 10A:
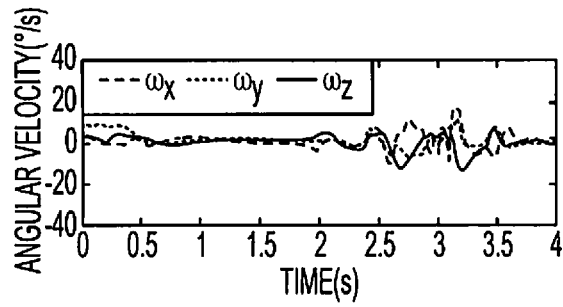
FIGS. 10A-10F show sensor data recorded by a wearable sensor device during spikes performed during experimental operation of a non-racket sport experimental implementation of a motion sensor data-driven system of embodiments of the present invention.
Figure 10B:
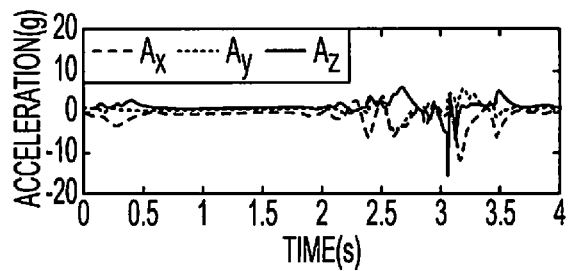
Figure 10C:
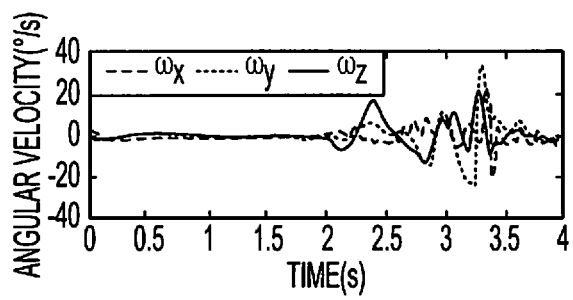
Figure 10D:
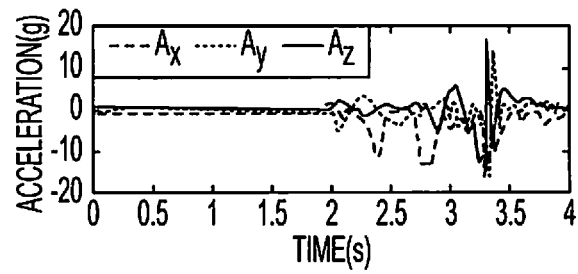
Figure 10E:
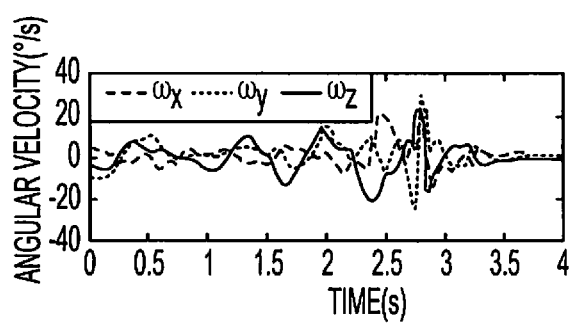
Figure 10F:
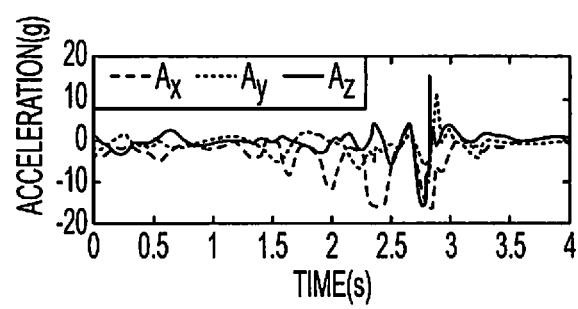
Figure 13A:
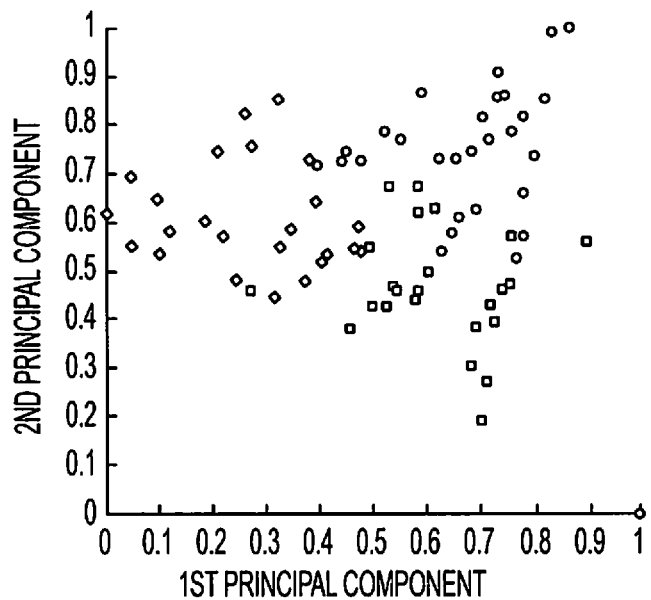
FIGS. 13A-13D show the PCA representation of training data and test data for experimental operation of a non-racket sport experimental implementation of a motion sensor data-driven system of embodiments of the present invention.
Figure 13B:
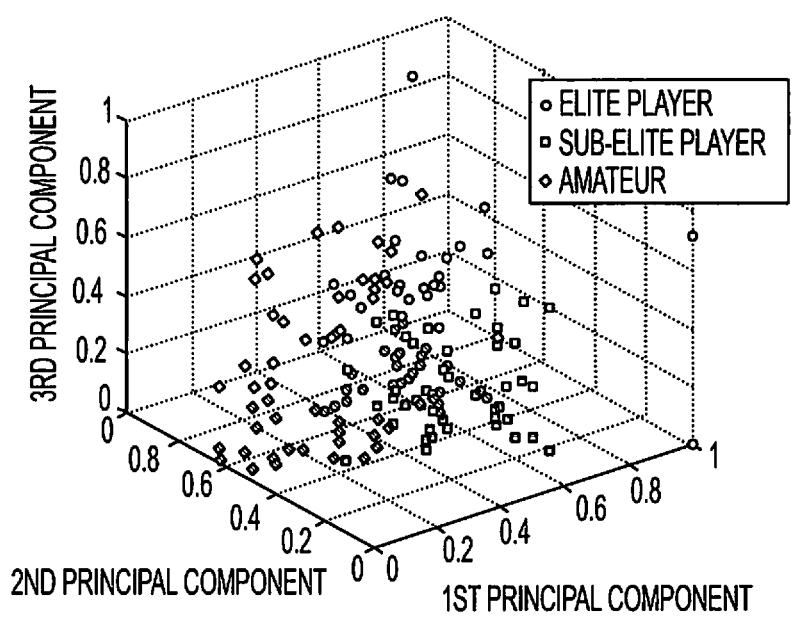
Figure 13C:
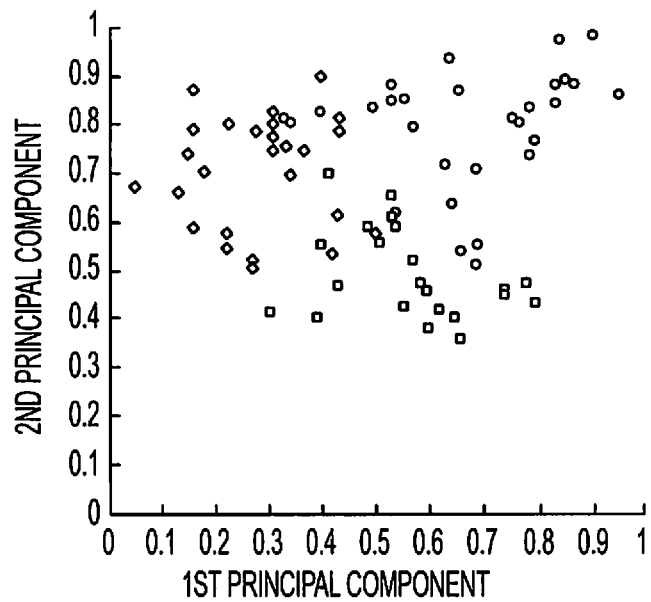
Figure 13D:
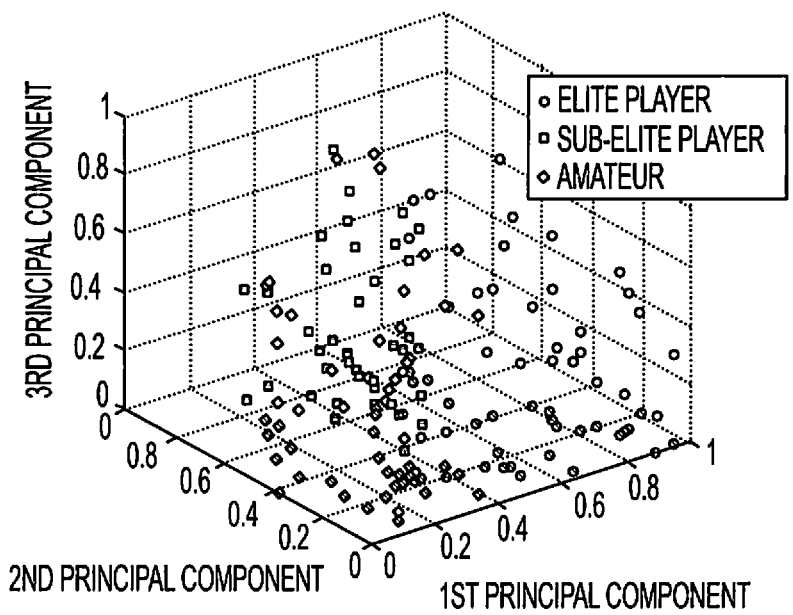

FIGS. 9A and 9B show raw data captured by WSD 110 during experimental operation of the exemplary non-racket sport motion sensor data-driven system. In particular, FIG. 9A shows the angular velocity and acceleration from a spike action performed by an amateur athlete under observation and FIG. 9B shows the angular velocity and acceleration from a spike action performed by an elite athlete under observation.

FIGS. 10A-10F show sensor data recorded by WSD 110 at athletes' wrists during spikes performed during experimental operation of the exemplary non-racket sport motion sensor data-driven system. In particular, FIGS. 10A-10F show the six-axis synchronized raw data from the athletes at different levels, wherein graphs of the measured angular velocities (FIG. 10A) and accelerations (FIG. 10B) of the amateur athletes, angular velocities (FIG. 10C) and accelerations (FIG. 10D) of the sub-elite athletes, and angular velocities (FIG. 10E) and accelerations (FIG. 10F) of the elite athletes are shown.

In operation of the exemplary non-racket sport motion sensor data-driven system in the experiment, movement data (e.g., as represented in FIGS. 9A and 9B and 10A-10F) for the recruited athletes was obtained by WSD 110 and reported to computer 122 for processing. Computer 122 implemented a machine learning data processing method providing volleyball actions recognition and/or skill level assessment for the experimental operation of the exemplary non-racket sport motion sensor data-driven system. Such data processing provided by the exemplary implementation included preprocessing, segmentation, feature extraction, dimensionality reduction and classification, such as shown in data processing flow 600 of FIG. 6 and as set forth in the example skill assessment preparation algorithm of FIG. 11.

In the data preprocessing performed by the exemplary non-racket sport motion sensor data-driven system, data points associated with the athlete under observation failing to spike the ball inside the target area were removed. The remaining raw data $\dot{S}(t)_{ij}$ from each recruited athlete was provided to computer 122 for performing the operations of data processing flow 600 and the example skill assessment preparation algorithm.

In operation according to the exemplary implementation in the experiment, the raw data $S(t)_{ij}$ from each athlete was loaded for processing as shown in step 1 of skill assessment preparation algorithm 1100 of FIG. 11, where i denotes ith volleyball subject and j represents the jth sensor node. Then, in step 2 of skill assessment preparation algorithm 1100, preprocessing was provided in which a 3-point filter moving average was applied to reduce the effect of noise and obtain a clearer $S(t)_{ij}$ signal. The statistical and morphology features were extracted and each dataset $\dot{X}_i = (f_1 \ldots f_m)$ was merged into a large matrix $\lambda$ in the segmentation and feature extraction of steps 3-5 of skill assessment preparation algorithm 1100, where m represents the number of features.

In operation of skill assessment preparation algorithm 1100 in the experimental implementation, statistical and morphological features are extracted as inputs for sports actions recognition and/or assessment. For example, in operation of the experimental implementation, 15 features, including 12 statistical features and 3 morphological features, were extracted from the segmented data matrix to provide extracted feature datasets $X_i = (c_1 \ldots c_p)$ as inputs for volleyball actions recognition and classification. The table below details the statistical and morphological features utilized in the experimental implementation of the exemplary non-racket sport motion sensor data-driven system. As can be appreciated from the details shown in the table below, the extracted features include time domain, frequency domain and heuristic domain features (e.g., mean and variance from the six axes, the maximum acceleration value from the x-axis and the magnitude of the acceleration and angular velocity composed by the 3-axis acceleration data, and the 3-axis angular velocity data). In operation according to the experimental implementation, a volleyball action (spike) database was compiled from the data provided inertial sensor. A skill assessment model for volleyball spiking was trained in operation of the exemplary non-racket sport motion sensor data-driven system as set forth in the example skill assessment model training algorithm of FIG. 12.

| NUMBER | SYMBOL | DESCRIPTION |
|---|---|---|
| 1 | $A_{ax}$ | Mean value of acceleration from x axis |
| 2 | $A_{ay}$ | Mean value of acceleration from y axis |
| 3 | $A_{az}$ | Mean value of acceleration from z axis |
| 4 | $D_{ax}$ | Variance of acceleration from x axis |
| 5 | $D_{ay}$ | Variance of acceleration from y axis |
| 6 | $D_{az}$ | Variance of acceleration from z axis |
| 7 | $A_{gx}$ | Mean value of angular velocity from x axis |
| 8 | $A_{gy}$ | Mean value of angular velocity from y axis |
| 9 | $A_{gz}$ | Mean value of angular velocity from z axis |
| 10 | $D_{gx}$ | Variance of angular velocity from x axis |
| 11 | $D_{gy}$ | Variance of angular velocity from y axis |
| 12 | $D_{gz}$ | Variance of angular velocity from z axis |
| 13 | $M_{ax}$ | The maximum acceleration value from the x-axis |
| 14 | $M_a$ | The magnitude of the 3-axis acceleration |
| 15 | $M_g$ | The magnitude of the 3-axis angular velocity |

Dimension reduction is provided by operation of skill assessment preparation algorithm 1100 to alleviate computing load and/or bandwidth requirements (e.g., bandwidth requirements during communication with the SD card) associated with the data processing by the exemplary non-racket sport motion sensor data-driven system. For example, steps 6-8 of skill assessment preparation algorithm 1100 utilize PCA to select p principle components before classification to reduce the computation load and increase the skill assessment because PCA shows better performance compared to nonlinear dimensionality reduction, wherein in step 8 n refers to the number of observations.

In implementing PCA for dimension reduction according to the exemplary implementation, it should be appreciated that the fifteen features of the experimental implementation extracted from the raw volleyball actions data may be expressed as vectors, where $f = [f_1, f_2, \ldots, f_{15}]$. Linear combinations of these original features and can be expressed as $f_n=[f_{n1}, f_{n2}, \ldots f_{nm}]$, where m represents the dimension to be reduced, as shown in equation (1) above. As there is only one node, equation (1) can be simplified to equation (2) shown above.

Using the eigenvalues of the covariance matrix, 98.19% of the total variance can be explained by the first three principal components according to the calculation of principal component variance. Therefore, the experimental implementation used these three principal components as an input to the next stage of data processing. FIGS. 13A-13D illustrate the PCA representation of both training data (FIGS. 3A and 3B) and test data (FIGS. 3C and 3D) of the exemplary implementation of the experiment. As can be seen in FIGS. 3A and 3C, two principle components (PCs) are already sufficient to visualize and group athletes at different levels while, as can be seen in FIGS. 3B and 3D, 3 PCs offers higher classification accuracy. 86% of information can be explained by first two PCs and 98% of information can be explained by 3 PCs.

In operation to provide classification by the exemplary implementation, a SVM classifier, providing a supervised learning algorithm used for solving a binary classification problem, was implemented. In the exemplary implementation of the exemplary non-racket sport motion sensor data-driven system, in light of there being three labels (e.g., amateur, sub-elite, and elite), a one-versus-one strategy was used in which a set of binary classifiers are constructed using corresponding data from the other two classes and then a voting scheme is applied. The hyperplane for the SVM classifier of exemplary implementation can be defined as follows:

$$W \cdot X + b = 0 \quad (10)$$

and the weight vector can be expressed as:

$$W = \{W_1 W_2 \ldots, W_n\} \quad (11)$$

where X is the training set from the spiking samples, b is the bias, and n is the number of features extracted from the spiking signal. Thus, this problem can be converted to the following equation:

$$d(X^T) = \Sigma_{i=1}^{1} y_i \alpha_i X_i X^T b_0 \quad (12)$$

where $y_i$ refers to the class label of support vector, $\alpha_i$ and $b_o$ refer to two constants, and X refers to the testing set of spiking samples whose labels are $y_i$.

To investigate the influence of parameters on classification performance, six sets of parameters of SVM, as shown in the table below, were tested. Accordingly, in testing classifier performances C values ranging from 1 to 50000, Gamma values ranging from 0.0001 to 0.1, and several different types of kernels were compared. The experimental implementation achieved the best classifier performance when C=1, and when using the linear kernel function.

| NUMBER | PENALTY PARAMETER (C) | GAMMA | KERNEL |
|---|---|---|---|
| 1 | 1 | 0.0001 | Linear |
| 2 | 100 | 0.0005 | Polynomial |
| 3 | 1000 | 0.001 | RBF |
| 4 | 5000 | 0.005 | Sigmoid |
| 5 | 10000 | 0.01 | |
| 6 | 50000 | 0.1 | |

Overall, 100 datasets were collected from 10 athletes under observation (i.e., each athlete performed 10 trials). Seven athletes' (including athletes from each group) datasets (70 datasets) were selected for the training, and the remaining datasets (30 datasets) from another three different athletes (also including athletes from each group) were selected for testing classifier performances. During the training process, 5-fold cross validation was used to avoid the overfilling problem and the best parameters of the SVM classifier were found. This was repeated 36 times to ensure that all possible combinations of testing sets with three subjects of different skill levels were covered. In comparing C values ranging from 1 to 50000, Gamma values ranging 0.0001 to 0.1, and several different types of kernels, it was found that the best classifier was achieved when C=1, and when using the linear kernel function. The table below shows the average classification results when using SVM following PCA (SVM+PCA).

| PLAYER | PRECISION | RECALL | F1-SCORE | TEST SAMPLES |
|---|---|---|---|---|
| Amateur | 100% | 0.90 | 0.95 | 10 |
| Sub-Elite | 83% | 1.00 | 0.91 | 10 |
| Elite | 100% | 0.90 | 0.95 | 10 |
| Avg/Total | 94% | 0.93 | 0.93 | 30 |

As can be seen in the table above, the recognition precisions of amateur athletes, sub-elite athletes, and elite athletes are 100%, 83%, and 100%, respectively. These results demonstrate clear distinction in performance between amateurs and elites. However, the performance of sub-elite athletes varies. On average, the precision of assessing the different levels of athletes reached 94%, indicating that experimental model is highly efficient.

To determine whether SVM+PCA provided the best classifier for the data of the experimental implementation for volleyball skill assessment (e.g., recognition of elite, sub-elite, and amateur levels), kNN non-parametric classifier and NB classifier were compared, as shown in the table below. In this comparison, different k values (from 1 to 11) were tested to find the best estimator for the experimental data, achieving—the best model results when k=5. The results from testing two other algorithms demonstrates that the computational efficient PCA+SVM is also sufficiently accurate.

| CLASSIFICATION ALGORITHM | PARAMETERS | ACCURACY |
|---|---|---|
| SVM + PCA | C = 1, GAMMA = 0.0001 | 94% |
| SVM | C = 1, GAMMA = 0.0001 | 90% |
| Nearest Neighbor | K = 5 | 90% |
| Naïve Bayes | N.A. | 84% |

As can be appreciated from the foregoing, the experimental implementation of the exemplary non-racket sport motion sensor data-driven system can automatically provide data statistics of volleyball players, which can help coaches and athletes themselves to learn about real condition changes during a match or a training session. Classification results provided by the experimental system strongly support the assumption that wrist motion is crucial in volleyball playing. In particular, the experimental implementation shows that it is feasible to identify level or performance from wrist motion data of volleyball spike actions. Using systems like that of the experimental implementation of the exemplary non-racket sport motion sensor data-driven system, a database of volleyball action movements may be compiled from players at different levels, which can then be used by sports scientists and professional coaches for further study and research.

It should be appreciated that, although the foregoing examples of a motion sensor data-driven system configured for use with respect to a racket sport (e.g., badminton) and of a motion sensor data-driven system configured for use with respect to a non-racket sport (e.g., volleyball) are described with reference to limb stroke sports in which the athlete's arm provides the principle sports actions analyzed, embodiments of the present invention may be utilized with respect to various sports using various limbs. For example, motion sensor data-driven system of embodiments of the invention may be configured for use with respect to limb stroke sport (e.g., football, also known as soccer in the United States, foot hockey, also known as hocker, etc.) in which the athlete's leg provides the principle sports actions analyzed racket sport (e.g., the WSD may be disposed about the athlete's ankle).

Although embodiments have been described herein with respect to a single WSD being worn by an athlete, it should be understood that further embodiments of the present invention may utilize a plurality WSDs with respect to any particular athlete under observation. For example, a WSD may be worn by an athlete on both wrists, both ankles, a wrist and an ankle, both wrists and both ankles, etc., such as where the athlete participates in limb stroke sports in which various limbs provide the principle sports actions analyzed.

Further, although embodiments have been described herein with reference to transmission of motion data to a cloud-based data process unit for processing (e.g., using PCA), it should be appreciated that the concepts of the present invention may be implemented in various configurations. For example, embodiments may implement preprocessing and/or PCA on a local device, such as a smartphone, PDA, and/or personal computer operable to communicate with one or more WSDs.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A motion sensor data-driven system for sports action assessment, the system comprising:
  a wearable sensor device (WSD) configured for wearability near a distal end of a limb of an athlete under observation by having a single motion sensor and a microcontroller unit (MCU) configured to operate in cooperation with the single motion sensor for collecting movement data for 3 axes of acceleration and 3 axes of angular rate for the athlete under observation performing one or more sports actions of a limb stroke sport, wherein the single motion sensor comprises a microelectromechanical system (MEMS) based inertial sensor configured to collect the movement data for the 3 axes of acceleration and the 3 axes of angular rate, and wherein the WSD is configured to transmit the movement data for real-time delivery to a motion sensor data processing platform;
  the motion sensor data processing platform in communication with the WSD and having logic configured to analyze the movement data obtained from the single motion sensor of the WSD for real-time assessment of performance of the one or more sports actions by the athlete under observation without aid of sensor data provided by another sensor unit worn by the athlete, wherein the logic configured to analyze the movement data obtained from the single motion sensor for the real-time assessment of performance of the one or more sports actions by the athlete under observation includes preprocessing logic configured to apply filtering to the movement data and provide a filtered signal, segmentation logic configured to apply a sliding window top-down technique to extract statistical and morphology features from the filtered signal and provide a segmented dataset merged into a segmented data matrix, feature extraction logic configured to extract time domain, frequency domain, and heuristic domain features from the segmented data matrix and provide extracted feature datasets as inputs for sports action recognition, dimensionality reduction logic configured to apply principle component analysis (PCA) to the extracted feature datasets and express linear combinations of the extracted feature datasets as vectors, and classification logic configured to apply a Support Vector Machine (SVM) to analyze the vectors and apply a voting scheme to recognize a particular sports action of the one or more sports actions by the athlete under observation represented by the movement data; and
  a processor-based system having an application configured to provide data regarding the particular sports action recognized by the logic of the motion sensor data processing platform for viewing in real-time by one or more of the athlete under observation, a trainer of the athlete under observation, and a coach of the athlete under observation.

2. The system of claim 1, wherein the MCU comprises a processor-based transceiver apparatus configured for wireless communication with one or more processor-based systems of the motion sensor data processing platform and providing the movement data to the one or more processor-based systems while the athlete under observation is participating in the limb stroke sport.

3. The system of claim 1, wherein the real-time assessment of performance of the one or more sports actions by the athlete under observation provides categorization of the athlete under observation into a skill level category of three or more skill level categories with respect to other athletes of the limb stroke sport.

4. The system of claim 1, wherein the time domain, frequency domain, and heuristic domain features extracted by the feature extraction logic include mean values of acceleration for the 3 axes of acceleration, variance of acceleration for the 3 axes of acceleration, mean values of angular velocity for the 3 axes of angular rate, variance of angular velocity for the 3 axes of angular rate, maximum acceleration in x-axis, acceleration magnitude data for the 3 axes of acceleration, angular velocity magnitude data for the 3 axes of angular rate, root mean square (RMS) of acceleration for the 3 axes of acceleration.

5. The system of claim 1, wherein the classification logic includes a Neural Network (NN), Decision Trees, and Naive Bayes (NB) classifier.

6. The system of claim 1, wherein the logic of the motion sensor data processing platform is configured to analyze the movement data obtained from the single motion sensor of the WSD for the real-time assessment of performance of the one or more sports actions by the athlete under observation without aid of an image capture device.

7. The system of claim 1, wherein the WSD comprises an integrated radio transceiver baseband processor module, the MEMS based inertial sensor, an on and off switch, and a coin cell battery, wherein the integrated radio transceiver baseband processor module comprises a radio transceiver and the MCU, and wherein the MEMS based inertial sensor comprises a 16 g motion sensor.

8. The system of claim 1, wherein the filtering applied to the movement data applies a 3-point filter moving average to filter out sensor noise.

9. The system of claim 8, wherein the filtering applied to the movement data comprises a low-pass filter, a K-points filter, and encoding Fourier transform.

* * * * *

UNITED STATES PATENT AND TRADEMARK OFFICE
CERTIFICATE OF CORRECTION

PATENT NO. : 11,971,951 B2
APPLICATION NO. : 16/014584
DATED : April 30, 2024
INVENTOR(S) : Yufan Wang et al.

It is certified that error appears in the above-identified patent and that said Letters Patent is hereby corrected as shown below:

In the Specification

At Column 14, Line number 46, delete "$\acute{S}(t)_{ij}$" and replace with --$\dot{S}(t)_{ij}$--.
At Column 14, Line number 50, delete "$\acute{S}(t)_{ij}$" and replace with --$\dot{S}(t)_{ij}$--.
At Column 14, Line number 67, delete "matrix X" and replace with --matrix $\dot{X}$--.
At Column 16, Line number 19, delete "Nave Bayes" and replace with --Naïve Bayes--.
At Column 16, Line number 58, Equation 4, delete the portion of the Equation reading "$\alpha_i$" and replace with --$\alpha_1$--.
At Column 17, Line number 38, delete "$\lambda$ refers to" and replace with --X refers to--.
At Column 23, Line number 57, delete "$\acute{S}(t)_{ij}$" and replace with --$\dot{S}(t)_{ij}$--.
At Column 24, Line number 4, delete "matrix $\lambda$" and replace with --matrix $\dot{X}$--.
At Column 25, Line number 42, Equation 12, delete the portion of the Equation reading "$X^T b_o$" and replace with --$X^T + b_o$--.

In the Claims

At Column 29, Claim number 5, starting at Line number 4, delete "Naive Bayes" and replace with --Naïve Bayes--.

Signed and Sealed this
Eighteenth Day of June, 2024

Katherine Kelly Vidal
*Director of the United States Patent and Trademark Office*